United States Patent
Hara et al.

(10) Patent No.: US 11,040,609 B2
(45) Date of Patent: Jun. 22, 2021

(54) ELECTRIC VEHICLE

(71) Applicant: Toyota Jidosha Kabushiki Kaisha, Toyota (JP)

(72) Inventors: Yasuhiro Hara, Nagoya (JP); Ayano Tsuruta, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 50 days.

(21) Appl. No.: 16/543,808

(22) Filed: Aug. 19, 2019

(65) Prior Publication Data
US 2020/0062097 A1    Feb. 27, 2020

(30) Foreign Application Priority Data

Aug. 21, 2018 (JP) .............................. JP2018-154933

(51) Int. Cl.
  *B60K 1/04* (2019.01)
  *B60L 50/60* (2019.01)
  (Continued)

(52) U.S. Cl.
  CPC ............... *B60K 1/04* (2013.01); *B60L 50/64* (2019.02); *B60L 50/66* (2019.02); *G05D 1/021* (2013.01);
  (Continued)

(58) Field of Classification Search
  CPC ... B60K 1/04; B60K 2001/0438; B60L 50/64; B60L 50/66; B60L 2200/18; B60Y 2200/91; G05D 1/021; G05D 2201/0212
  (Continued)

(56) References Cited

U.S. PATENT DOCUMENTS 6,293,748 B1 * 9/2001 Savaria ................. B60P 1/43
  14/69.5
8,453,773 B2 * 6/2013 Hill ..................... B62D 47/02
  180/65.29
(Continued)

FOREIGN PATENT DOCUMENTS

CN    206231472 U    6/2017
JP    2006-525177 A    11/2006
(Continued)

OTHER PUBLICATIONS

Extended European Search Report issued by European Patent Office dated Feb. 5, 2020 in EP 19191394.6.
(Continued)

*Primary Examiner* — John D Walters
(74) *Attorney, Agent, or Firm* — Dinsmore & Shohl LLP

(57) ABSTRACT

An electric vehicle includes a vehicle cabin, a battery, a drive unit, and an end doorway. The vehicle cabin is provided with a floor having a flat floor surface, and configured such that an occupant is able to be in the vehicle cabin in any one of a seated position and a standing position. The battery is accommodated under the floor of the vehicle cabin. The drive unit is provided on one of a front side and a rear side with respect to the battery in a vehicle longitudinal direction. The end doorway is provided in a longitudinally-end wall of the vehicle cabin, and provided on the other one of the front side and the rear side with respect to the battery in the vehicle longitudinal direction. The end doorway is configured such that the occupant is able to get on and off the electric vehicle through the end doorway.

7 Claims, 16 Drawing Sheets

(51) Int. Cl.
  *B60L 50/64*   (2019.01)
  *G05D 1/02*    (2020.01)
(52) U.S. Cl.
  CPC ... *B60K 2001/0438* (2013.01); *B60L 2200/18* (2013.01); *B60Y 2200/91* (2013.01); *G05D 2201/0212* (2013.01)
(58) Field of Classification Search
  USPC .................................................. 180/68.5
  See application file for complete search history.

(56) References Cited

U.S. PATENT DOCUMENTS

| | | | | |
|---|---|---|---|---|
| D800,017 | S | 10/2017 | Sapet | |
| 10,493,893 | B2 * | 12/2019 | Matsuoka | B60P 1/436 |
| 10,835,428 | B2 * | 11/2020 | MacPherson | A61G 3/065 |
| 2003/0044266 | A1 * | 3/2003 | Vandillen | B60P 1/433 414/537 |
| 2007/0012496 | A1 | 1/2007 | Chene et al. | |
| 2011/0300426 | A1 * | 12/2011 | Iwasa | B60L 58/21 429/99 |
| 2016/0207418 | A1 | 7/2016 | Bergstrom et al. | |
| 2018/0022405 | A1 | 1/2018 | Gecchelin et al. | |
| 2018/0095473 | A1 | 4/2018 | Fakhfakh et al. | |

FOREIGN PATENT DOCUMENTS

| | | |
|---|---|---|
| JP | 2009-078740 A | 4/2009 |
| KR | 1020100012327 A | 2/2010 |
| KR | 1020110112437 A | 10/2011 |
| RU | 2561188 C2 | 8/2015 |

OTHER PUBLICATIONS https://www.motorgraph.com/news/articlePrint.html?idxno=10810; Oct. 27, 2016; Partial translation of office action dated Jul. 4, 2020 in KR 10-2019-0099506 provided.
"e-NV200 Evalia", Feb. 1, 2017; URL: https://www-europe.nissan-cdn.net/content/dam/Nissan/it/brochures/e-NV200_EVALIA.pdf; Search Report provided.
"Roadside Assistance Guide 2018 e-NV200", Nissan, Jun. 1, 2018; URL: https://www-europe.nissan-cdn.net/content/dam/Nissan/ireland/Brochures/First%20Responders%20Guide/2018%20e-NV200%20Roadside%20Assistance%20Guide.pdf.
"Nissan e-NV200 Combi in-depth review—Carbuyer", Carbuyer, Feb. 22, 2016, YouTube video, URL: https://www.youtube.com/watch?v=UlTIMSDaaDc.
"5 Ramp Options for a Wheelchair Van | Silver Cross Automotive", Silver Cross Automotive, May 10, 2017, YouTube video, URL: https://www.youtube.com/watch?v=c2gsPLs8pTk.
"An in depth look at the Nissan NV200", Another Car Site!, Apr. 4, 2013, YouTube video, https://www.youtube.com/watch?v=EX9KtpDY3o8.
"Microlino—Stadtauto mit Elektroantrieb", Messe TV, Feb. 8, 2018, YouTube video, URL: https://www.youtube.com/watch?v=HNRasmLopBc; Search Report provided.
Press Release—"Toyota Launches New Mobility Ecosystem and Concept Vehicle at 2018 CES®" (Jan. 8, 2018).
Kuznetsov, S.A., "Great Explanatory Dictionary", S-Petersburg, 2002, p. 1334; Partial translation of office action dated Feb. 19, 2020 in RU 2019125718 provided.

* cited by examiner

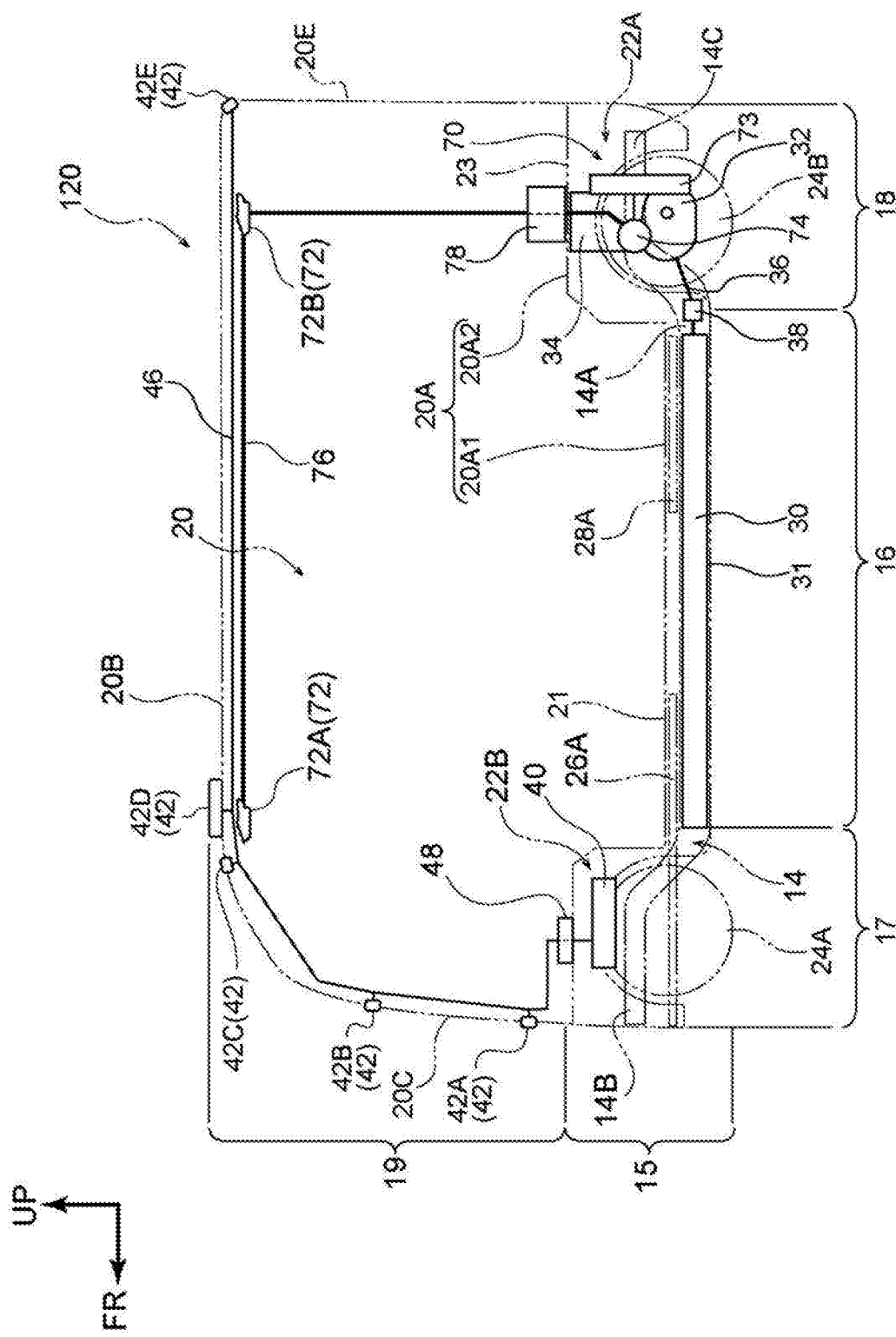

ELECTRIC VEHICLE

CROSS-REFERENCE TO RELATED APPLICATIONS

This application claims priority to Japanese Patent Application No. 2018-154933 filed on Aug. 21, 2018, which is incorporated herein by reference in its entirety including the specification, drawings and abstract.

BACKGROUND

1. Technical Field

The disclosure relates to an electric vehicle.

2. Description of Related Art

US Pre-grant Publication No. 2018/0095473 describes an electric vehicle for fully autonomous driving. US Pre-grant Publication No. 2018/0095473 describes the arrangement of sensors in the electric vehicle, but does not describe the arrangement of a motor, a battery, an air conditioner, and so forth.

SUMMARY

In the technical field pertaining to a fully autonomous vehicle that does not require a driver seat, there is a need to conduct a study regarding the configuration of each of elements including a doorway in order to achieve efficient utilization of a vehicle cabin space while maintaining sufficient occupant's ease of getting on and off the fully autonomous vehicle. The disclosure provides an electric vehicle having a wide vehicle cabin space and having a configuration that allows occupants to easily get on and off the electric vehicle.

An electric vehicle according to an aspect of the disclosure includes a vehicle cabin, a battery, a drive unit, and an end doorway. The vehicle cabin is provided with a floor having a floor surface that is flat. The vehicle cabin is configured such that an occupant is able to be in the vehicle cabin in any one of a seated position and a standing position. The battery is accommodated under the floor of the vehicle cabin. The drive unit is provided on one of a front side and a rear side with respect to the battery in the vehicle longitudinal direction. The end doorway is provided in a longitudinally-end wall of the vehicle cabin, and the longitudinally-end wall is provided on the other one of the front side and the rear side with respect to the battery in the vehicle longitudinal direction. The end doorway is configured such that the occupant is able to get on and off the electric vehicle through the end doorway.

According to the foregoing aspect, the battery is accommodated under the floor, and thus the vehicle cabin space can be efficiently utilized. Further, the doorway is provided in the longitudinally-end wall that is on the opposite side of the battery from the drive unit in the vehicle longitudinal direction, and thus a wide vehicle cabin space is obtained and occupants can easily get on and off the electric vehicle.

In the foregoing aspect, the electric vehicle may further include an end slope provided at the end doorway. The end slope may be configured to extend from the floor surface toward an outside of the vehicle cabin.

With this configuration, there is no step (level difference) between a road surface and the floor of the vehicle cabin when occupants are getting on and off the electric vehicle. This enables a person in a wheeled chair to easily get on and off the electric vehicle and facilitates loading and unloading of luggage or a trolley.

In the foregoing aspect, the electric vehicle may further include a side doorway provided in a side wall of the vehicle cabin. The side doorway may be configured such that the occupant is able to get on and off the electric vehicle through the side doorway. The side wall is an end wall of the vehicle cabin in the vehicle-width direction.

With this configuration, the occupants can get on the electric vehicle from any one of a roadway and a sidewalk and can get off the electric vehicle to any one of the roadway and the sidewalk.

In this configuration, the electric vehicle may further include a side slope provided at the side doorway. The side slope may be configured to extend from the floor surface toward an outside of the vehicle cabin.

With this configuration, there is no step (level difference) between a sidewalk and the floor of the vehicle cabin when occupants are getting on and off the electric vehicle. This enables a person in a wheeled chair to easily get on and off the electric vehicle and facilitates loading and unloading of luggage or a trolley.

In the foregoing configuration, the electric vehicle may further include a side doorway provided in a side wall of the vehicle cabin, and a side slope. The side doorway may be configured such that the occupant is able to get on and off the electric vehicle through the side doorway. The side wall is an end wall of the vehicle cabin in the vehicle-width direction. The side slope may be provided at the side doorway. The side slope may be configured to extend from the floor surface toward an outside of the vehicle cabin. The side slope may be accommodated at a position that does not overlap with an accommodation position of the end slope in a plan view of a part of the electric, vehicle under the floor.

With this configuration, the floor of the vehicle cabin can be provided at a position lower than that in a case where the accommodation position of the end slope and the accommodation position of the side slope overlap with each other in a plan view of the part of the electric vehicle under the floor. As a result, it is possible to obtain a wide vehicle cabin space.

In the foregoing configuration, the electric vehicle may further include a connector configured to electrically connect the battery and the drive unit to each other at a junction between a vehicle center part and one of a vehicle front part and a vehicle rear part, the one of the vehicle front part and the vehicle rear part including the drive unit. The vehicle center part is a part of the electric vehicle, and the vehicle center part includes the battery. The vehicle front part is a part of the electric vehicle, and the vehicle front part includes one of the drive unit and the end doorway. The vehicle front part is coupled to the vehicle center part. The vehicle rear part is a part of the electric vehicle, and the vehicle rear part includes the other of the drive unit and the end doorway. The vehicle rear part is coupled to the vehicle center part.

With this configuration, the electric vehicle is manufactured by assembling together the vehicle front part, the vehicle center part, and the vehicle rear part. The vehicle front part, the vehicle center part, and the vehicle rear part may each be a module that is an assembly of a plurality of components. For example, by preparing a plurality of kinds of center modules, one kind of front module, and one kind of rear module, it is possible to manufacture vehicles with different sizes. For this reason, it is possible to decrease the number of process steps and improve the production efficiency in manufacturing of vehicles with different sizes.

According to the foregoing aspect of the disclosure, it is possible to provide an electric vehicle having a wide vehicle cabin space and having a configuration that allows occupants to easily get on and off the electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a side sectional view of an electric vehicle according to a fourth embodiment and is a diagram illustrating devices related to autonomous driving and an air conditioning system;

DETAILED DESCRIPTION OF EMBODIMENTS

Figure 1:
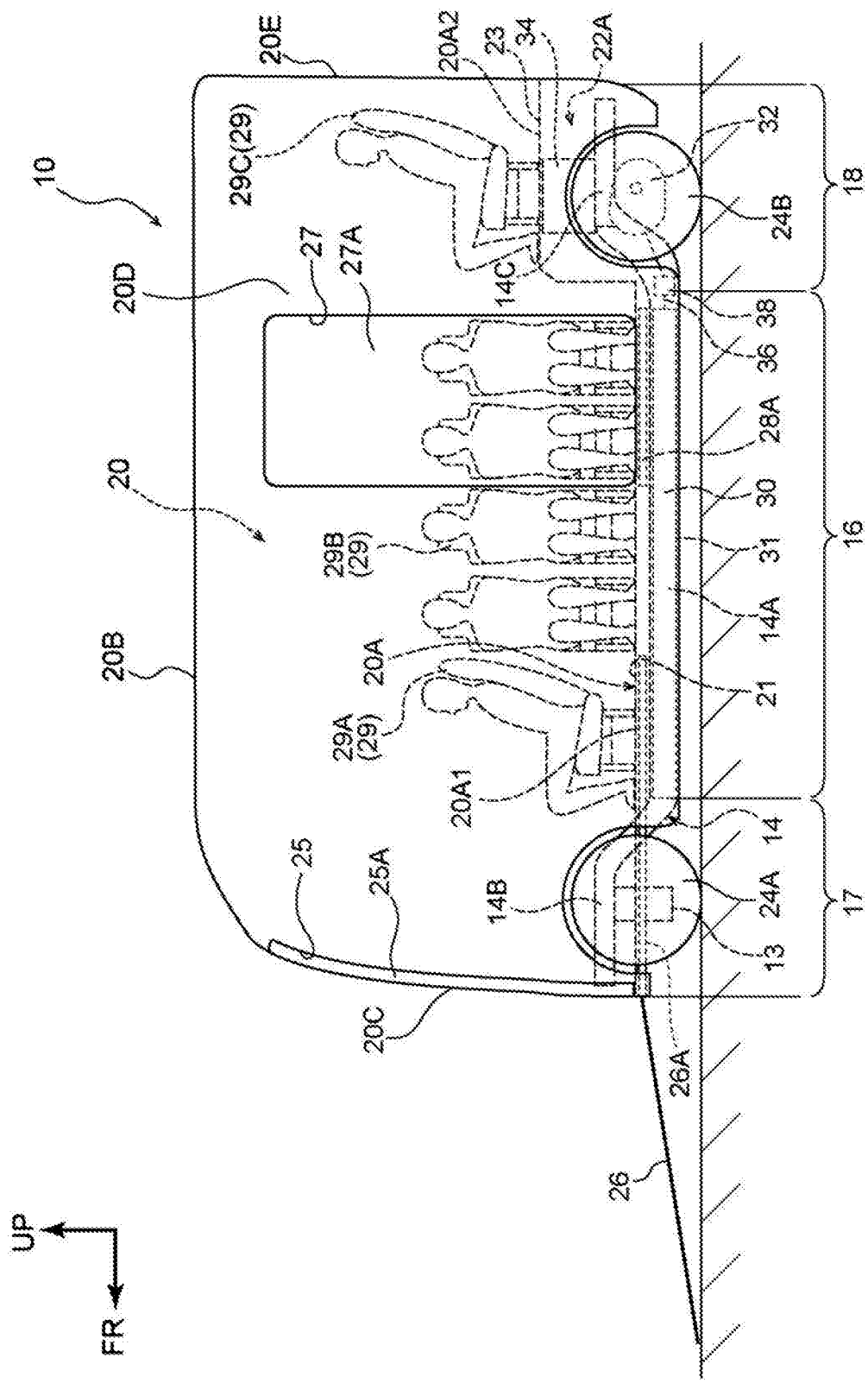
FIG. 1 is a side view of an electric vehicle according to a first embodiment.

Hereinafter, electric vehicles according to example embodiments of the disclosure will be described with reference to the accompanying drawings. In the drawings, an arrow FR indicates the vehicle front side, an arrow UP indicates the vehicle upper side, an arrow LH indicates the left side in the vehicle-width direction, and an arrow RH indicates the right side in the vehicle-width direction. In the description below, "front", "rear", "forward", "rearward", and so forth will denote the positional relationship in the vehicle longitudinal direction (in this specification, "vehicle longitudinal direction" means "vehicle front-rear direction"), unless otherwise specified. Further, "above", "below", "upper", "lower", "upward", "downward", and so forth will denote the positional relationship in the vehicle-height direction, unless otherwise specified.

First Embodiment

Configuration

Figure 2:
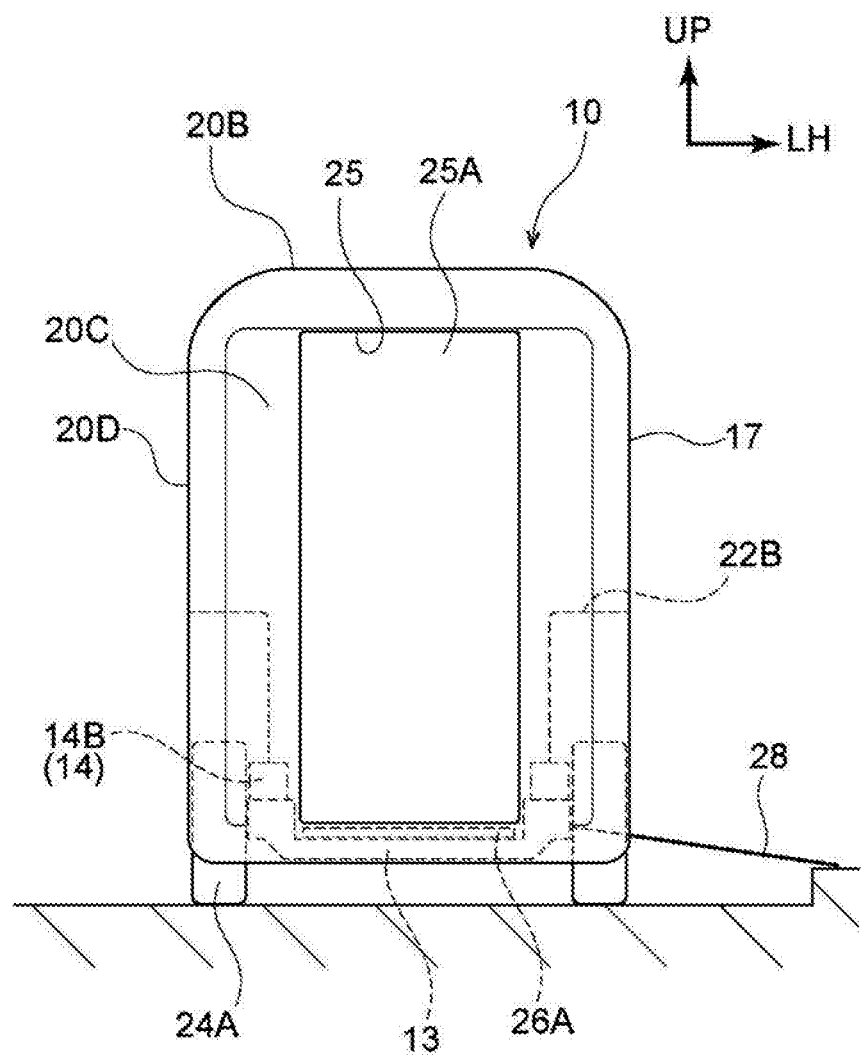
FIG. 2 is a front view of the electric vehicle according to the first embodiment.

A vehicle 10 of a first embodiment is an electric vehicle configured to perform fully autonomous driving. As illustrated in FIG. 1 and FIG. 2, the appearance of the vehicle 10 is in the form of a substantially rectangular parallelepiped defined by a roof 20B, a front wall 20C, side walls 20D, and a rear wall 20E. Further, front wheels 24A are provided at a vehicle front part, and rear wheels 24B are provided at a vehicle rear part. Each of the front wall 20C and the rear wall 20E is an example of "longitudinally-end wall".

Figure 3:
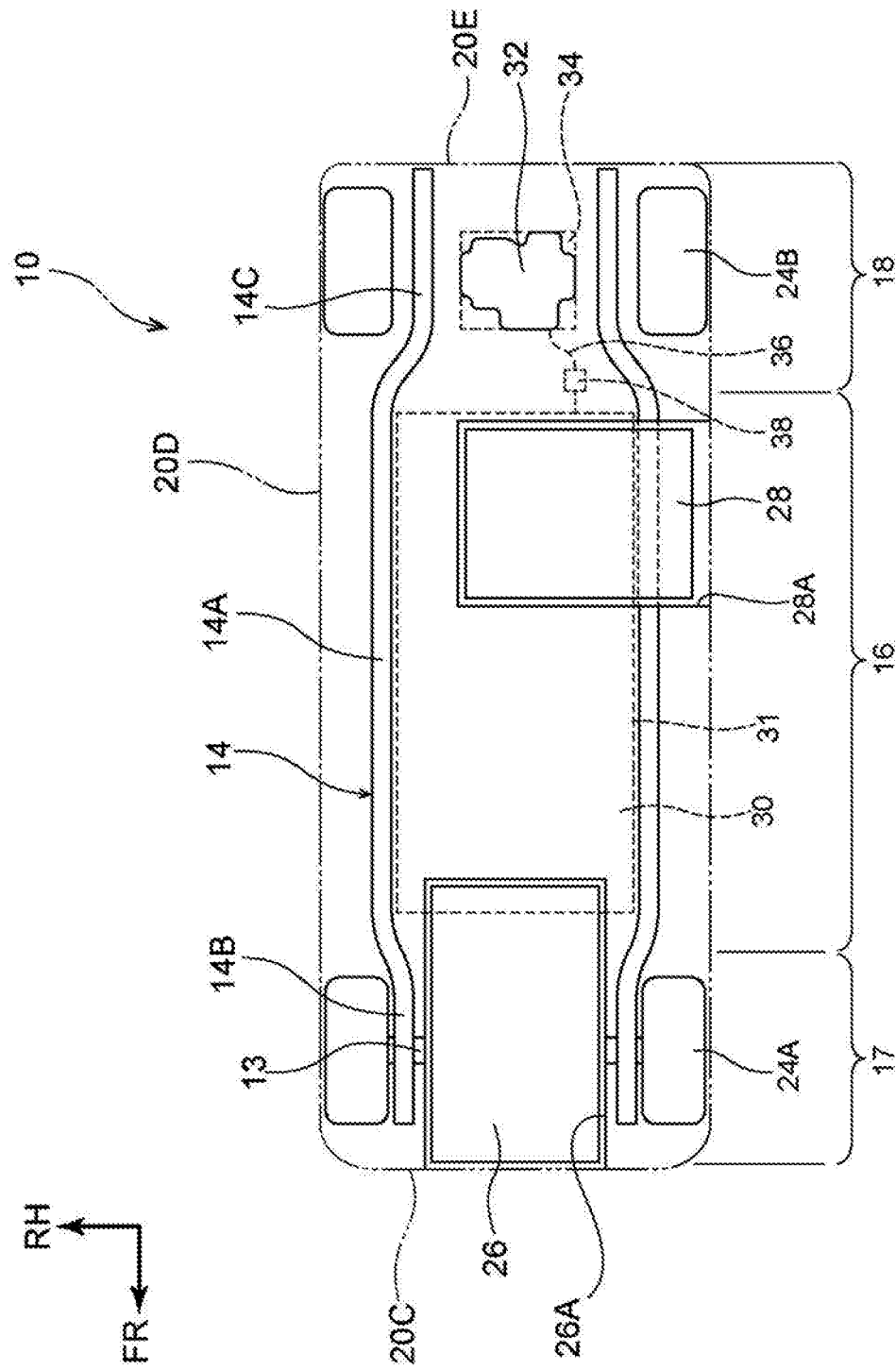
FIG. 3 is a plan sectional view of the electric vehicle according to the first embodiment.

The vehicle 10 of the first embodiment includes a plurality of modules coupled together. As illustrated in FIG. 1 and FIG. 3, the vehicle 10 includes a center module 16 that constitutes a vehicle center part in the vehicle longitudinal direction (vehicle front-rear direction), a front module 17 coupled to a front end of the center module 16, and a rear module 18 coupled to a rear end of the center module 16. The boundary between the front module 17 and the center module 16 is at a position slightly rearward of the front wheel 24A. The boundary between the center module 16 and the rear module 18 is at a position slightly forward of the rear wheel 24B. In the description below, in the longitudinal direction (front-rear direction) of the vehicle 10, a part of the vehicle 10 where the front module 17 is provided will be referred to as "vehicle front part", a part of the vehicle 10 where the center module 16 is provided will be referred to as "vehicle center part", and a part of the vehicle 10 where the rear module 18 is provided will be referred to as "vehicle rear part" (the same also applies to the other embodiments).

Note that, the center module 16, the front module 17, and the rear module 18 may constitute only a vehicle lower part. In this case, the vehicle 10 further includes a roof module constituting a vehicle upper part, and the roof module is coupled to the center module 16, the front module 17, and the rear module 18 that have been coupled together.

The center module 16 includes a center part of each side wall 20D in the vehicle longitudinal direction and a battery case 31. Note that, in the first embodiment, several kinds of center modules 16 having different lengths in the vehicle longitudinal direction are prepared.

Figure 4:
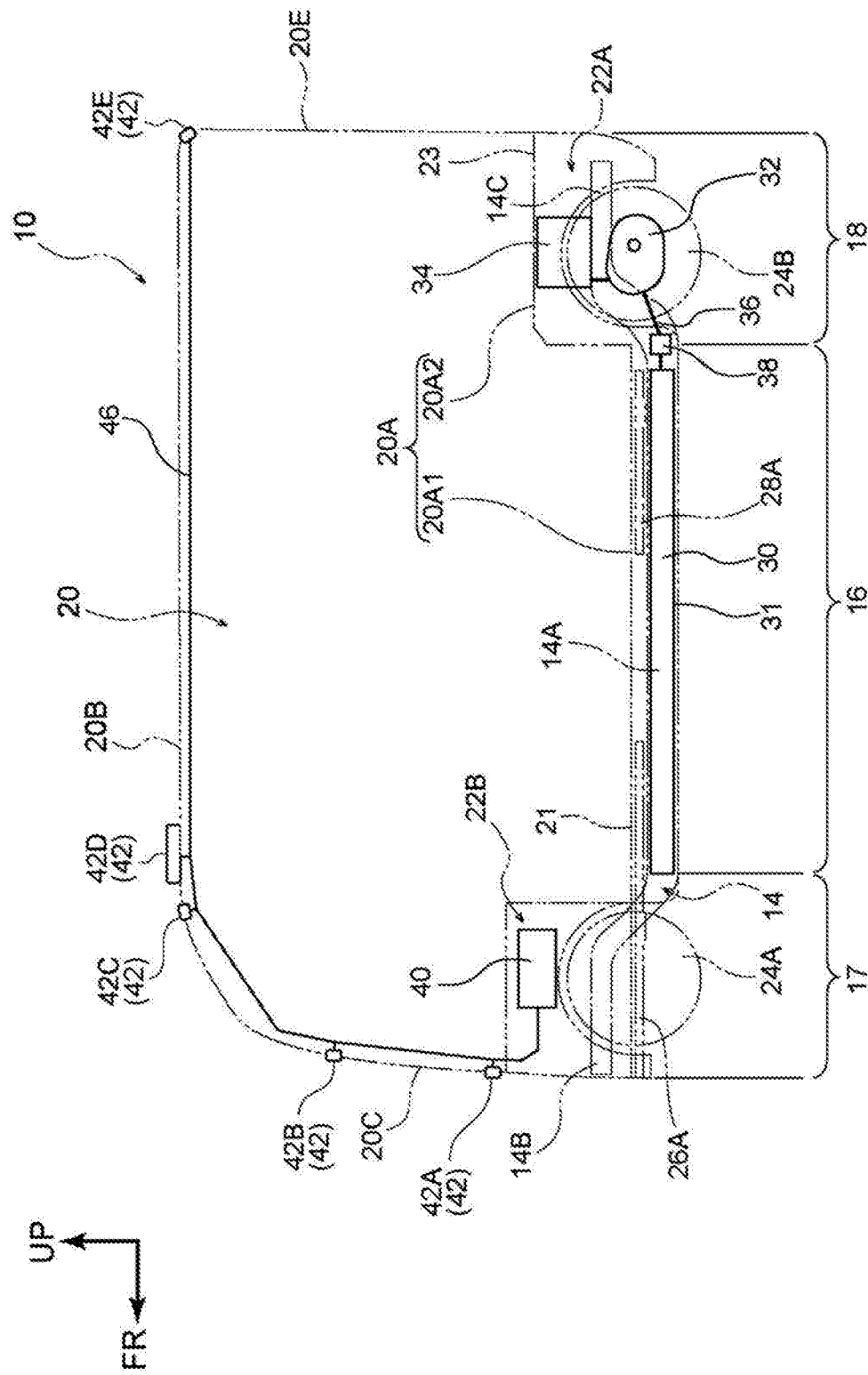
FIG. 4 is a side sectional view of the electric vehicle according to the first embodiment and is a diagram illustrating devices related to autonomous driving.

The front module 17 includes the front wall 20C, a front part of each side wall 20D, and an autonomous driving unit 40 (see FIG. 4).

The rear module 18 includes the rear wall 20E, a rear part of each side wall 20D, a drive unit 32, and a power unit 34.

A pair of side members 14 extending in the vehicle longitudinal direction is provided in the vehicle lower part of the vehicle 10. Each side member 14 includes a center side member 14A, a front side member 14B, and a rear side member 14C. The center side member 14A extends from a position rearward of the front wheel 24A to a position forward of the rear wheel 24B. The front side member 14B extends from the center side member 14A upward and inward in the vehicle-width direction and then extends toward the front of the vehicle 10. The rear side member 14C extends from the center side member 14A upward and inward in the vehicle-width direction and then extends toward the rear of the vehicle 10. The center side member 14A is provided in the center module 16, the front side member 14B is provided in the front module 17, and the rear side member 14C is provided in the rear module 18.

A front axle 13 that supports the front wheel 24A is held by the front side member 14B. The drive unit 32 configured to drive the rear wheels 24B is held by the rear side member 14C.

As illustrated in FIG. 1, the vehicle 10 includes a power unit room 22A that accommodates the drive unit 32, and a vehicle cabin 20 that is separated from the power unit room 22A by a dash panel 23. The power unit room 22A of the first embodiment is provided in a region included in both the vehicle lower part and the vehicle rear part. The power unit room 22A is a space that surrounds the rear wheel 24B in a side view.

In addition to the drive unit 32, the power unit 34 as a high-voltage component is accommodated in the power unit room 22A. The drive unit 32 includes at least a motor for traveling and a transaxle that are unitized together. The power unit 34 includes at least a boost converter and an inverter that are unitized together. The power unit 34 is electrically connected to a battery 30 (described later) via a power cable 36. On the power cable 36, a power connector 38 is provided at a junction between the center module 16 and the rear module 18.

The vehicle cabin 20 is a space having a substantially rectangular parallelepiped shape, and is composed of a space forward of the power unit room 22A and a space above the power unit room 22A. In the vehicle cabin 20 of the first embodiment, a floor surface 20A is defined by a floor panel 21 and a dash panel 23. The floor panel 21 is flat, and is provided so as to extend over the vehicle front part and the vehicle center part. The dash panel 23 is provided in the vehicle rear part and defines the power unit room 22A. That is, the floor surface 20A includes a lower floor portion 20A1 defined by the floor panel 21, and a higher floor portion 20A2 defined by the dash panel 23 located at a position higher than the floor panel 21.

As illustrated in FIG. 2, the vehicle cabin 20 is provided with projection portions 22B that project inward in the vehicle-width direction and that are provided in the vehicle front part. The projection portion 22B defines a part of a wheel well that accommodates the front wheel 24A, and the autonomous driving unit 40 serving as a control unit is accommodated in a space adjacent to the wheel well (see FIG. 4). The autonomous driving unit 40 includes an autonomous driving electronic control unit (ECU) configured to control autonomous driving of the vehicle 10 and an interface electronic control unit (ECU) configured to control communication with a steering unit and an acceleration-deceleration unit. As illustrated in FIG. 4, a plurality of sensors 42 configured to acquire the surroundings of the vehicle 10 is connected to the autonomous driving unit 40. The sensors 42 include a camera that captures an image of a predetermined range, a millimeter-wave radar that transmits a probe wave within a predetermined range, and Light Detection and Ranging/Laser Imaging Detection and Ranging (LIDAR) unit that scans a predetermined range. Note that, a front doorway 25 and a side doorway 27 are not illustrated in FIG. 4.

The sensors 42 include front sensors 42A, 42B provided on a front surface of the vehicle 10, upper sensors 42C, 42D provided on a front part of an upper surface of the roof 20B, and a rear sensor 42E provided at a rear end of the roof 20B. Each sensor 42 and the autonomous driving unit 40 are connected to each other via a signal cable 46 as a cable. In order to recognize the state of a traffic signal installed on a road on which the vehicle 10 is traveling, at least one of the front sensor 42A, the front sensor 42B, and the upper sensor 42C which are provided at the vehicle front part, is provided with a camera.

The signal cable 46 extending upward from the autonomous driving unit 40 is connected to the front sensors 42A, 42B and the upper sensor 42C and is then connected to the upper sensor 42D. Then, the signal cable 46 extends rearward from the upper sensor 42D and is connected to the rear sensor 42E. On the roof 20B-side, the signal cable 46 is provided in a gap between an interior material and a roof panel that are included in the roof 20B and is routed in the vehicle longitudinal direction.

As described above, the vehicle cabin 20 of the first embodiment is provided with the lower floor portion 20A1 that is a flat floor surface. The lower floor portion 20A1 is defined by the floor panel 21 that is flat. The lower floor portion 20A1 is provided forward of the power unit room 22A. As illustrated in FIG. 1, the lower floor portion 20A1 is provided below the axle of the front wheel 24A and the axle of the rear wheel 24B. The vehicle cabin 20 has such a height that an occupant can be in the vehicle cabin 20 in a standing position. Here, an example of "occupant" may be an adult standard (average) dummy, such as a dummy of an AM50 type (50 percentile of American male adults) of World Side Impact Dummy (WorldSID). That is, the vehicle cabin 20 of the first embodiment has such a height that a clearance is left between the roof 20B and the head of the AM50 type dummy in a standing position. Note that, an example of "occupant" is not limited to the AM50 type dummy, and other impact dummies and statistically obtained standard body models may be used.

The vehicle cabin 20 is provided with a plurality of seats 29 on which occupants can sit. The seats 29 of the first embodiment include one front-row seat 29A provided at a front part of the vehicle cabin 20, a plurality of intermediate-row seats 29B arranged side by side and provided rearward of the front-row seat 29A, and one rear-row seat 29C provided above the power unit room 22A. The front-row seat 29A and the intermediate-row seats 29B are fixed to the floor panel 21, and the rear-row seat 29C is fixed to the dash panel 23. The front-row seat 29A and the rear-row seat 29C are provided such that seated occupants face the front of the vehicle 10. At least four intermediate-row seats 29B are provided at a right part of the vehicle cabin 20 in the vehicle-width direction. The intermediate-row seats 29B are provided such that seated occupants face to the left in the vehicle-width direction. However, the manner of arranging the intermediate-row seats 29B is not limited to this. For example, the intermediate-row seats 29B may be provided such that seated occupants face the front of the vehicle 10. Further, each seat 29 may be rotatable about an axis extending in the vehicle-height direction.

The battery 30 is accommodated under the floor of the vehicle cabin 20, specifically, under a portion of the floor panel 21, which is in the vehicle center part. More specifically, the battery 30 is accommodated in the battery case 31.

The battery case 31 is provided between the two center side members 14A that are provided in the vehicle center part. The battery case 31 is fixed to the center side members 14A.

The front wall 20C provided at the front of the vehicle cabin 20 is provided with the front doorway 25, which is an example of "end doorway". The front doorway 25 has a configuration that allows adult occupants to walk into and out of the vehicle cabin 20. The front doorway 25 is configured to be closed by a hinged door 25A that is provided so as to be pivotable about one end thereof in the vehicle-width direction. Further, the front doorway 25 is provided with a front slope 26, which is an example of "end slope". The front slope 26 is configured to extend obliquely downward from the lower floor portion 20A1 toward a roadway. While the vehicle 10 is traveling, the front slope 26 is accommodated in a front accommodation portion 26A provided under the floor panel 21 (see FIG. 3). In a use state of the front slope 26, in which occupants are getting on or off the vehicle 10, the front slope 26 has been drawn forward out of the front accommodation portion 26A.

Further, the side wall 20D provided at the lateral side (the left side in the vehicle-width direction) of the vehicle cabin 20 is provided with the side doorway 27 having a configuration that allows adult occupants to walk into and out of the vehicle cabin 20. The side doorway 27 is configured to be closed by a slide door 27A that is provided so as to be slidable toward the front of the vehicle 10. As illustrated in FIG. 2, the side doorway 27 is provided with a side slope 28 configured to extend obliquely downward from the lower floor portion 20A1 toward a sidewalk (or a roadway). While the vehicle 10 is traveling, the side slope 28 is accommodated in a side accommodation portion 28A provided in a gap between the floor panel 21 and the battery case 31 (see FIG. 3). In a use state of the side slope 28, in which occupants are getting on or off the vehicle 10, the side slope 28 has been drawn out of the side accommodation portion 28A to the lateral side of the vehicle 10.

As illustrated in FIG. 3, in a plan view, the side accommodation portion 28A is provided at such a position that the side accommodation portion 28A does not overlap with the front accommodation portion 26A. That is, in a plan view, the side slope 28 is accommodated at such a position that the side slope 28 does not overlap with the front slope 26.

Manufacturing Method

In the first embodiment, first, the center module 16, the front module 17, and the rear module 18 are individually manufactured. For example, during manufacturing of the center module 16, a pan of the roof 20B, a part of each side wall 20D, and a part of the floor panel 21, which are to be included in the vehicle center part, the center side members 14A, and so forth are assembled together and the battery case 31 is fixed to the center side members 14A.

During manufacturing of the front module 17, the front wall 20C, a part of the roof 20B, a part of each side wall 20D, and a part of the floor panel 21, which are to be included in the vehicle front part, the front side members 14B, the front wheels 24A, and so forth are assembled together and the autonomous driving unit 40 is fixed to the inner side of the projection portion 22B. Further, during manufacturing of the rear module 18, the rear wall 20E, a part of the roof 20B and a part of each side wall 20D, which are to be included in the vehicle rear part, the rear side members 14C, the dash panel 23, the rear wheels 24B, and so forth are assembled together. Then, the drive unit 32 and the power unit 34 are fixedly provided in the power unit room 22A.

Then, the front module 17 and the rear module 18 are coupled to the center module 16. At the time of coupling the modules together, the autonomous driving unit 40 and each sensor 42 are connected to each other by the signal cable 46. Further, the battery 30 and the power unit 34 are connected to each other by the power cable 36. That is, the battery 30 and the drive unit 32 are electrically connected to each other.

Modified Example of First Embodiment

Figure 5:
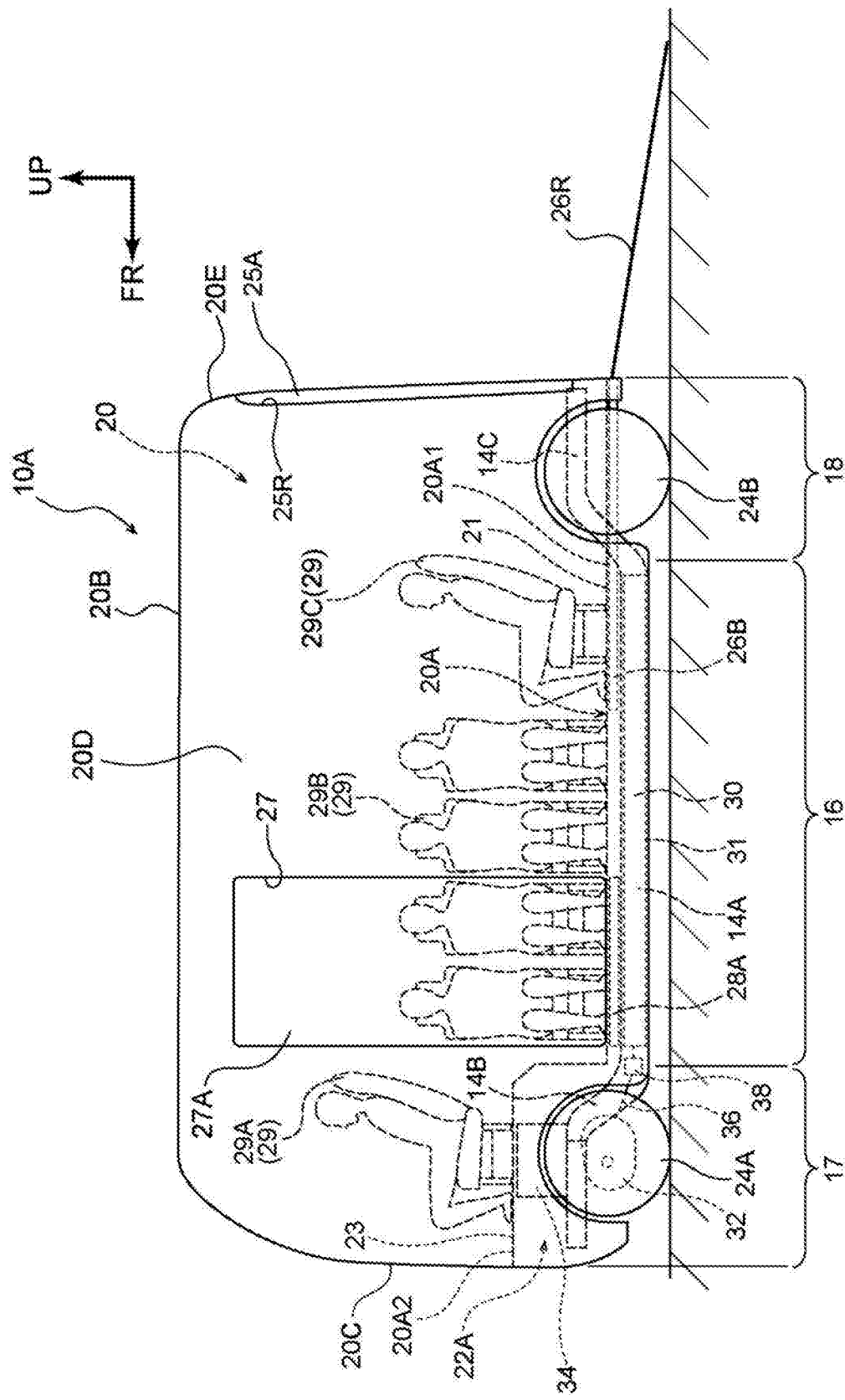
FIG. 5 is a side view of an electric vehicle according to Modified Example 1 of the first embodiment.

The vehicle 10 of the first embodiment is configured such that the front doorway 25, which is an example of the end doorway, is provided at the front of the vehicle 10, and the drive unit 32 is provided in the vehicle rear part. However, the position of the end doorway and the position of the drive unit 32 may be reversed in the vehicle longitudinal direction (vehicle front-rear direction). For example, as illustrated in FIG. 5, in a vehicle 10A of Modified Example 1 of the first embodiment, the drive unit 32 is provided in the vehicle front part, and a rear doorway 25R, which is an example of the end doorway, is provided at the rear of the vehicle 10A. The rear doorway 25R is configured to be closed by a hinged door 25A that is provided so as to be pivotable about one end thereof in the vehicle-width direction. Further, the rear doorway 25R is provided with a rear slope 26R, which is an example of "end slope". The rear slope 26R is configured to extend obliquely downward from the lower floor portion 20A1 toward a roadway. While the vehicle 10A is traveling, the rear slope 26R is accommodated in a rear accommodation portion 26B provided under the floor panel 21. In a use state of the rear slope 26R, in which occupants are getting on or off the vehicle 10A, the rear slope 26R has been drawn rearward out of the rear accommodation portion 26B. The Modified Example 1 provides operations and effects similar to those of the first embodiment.

Figure 6:
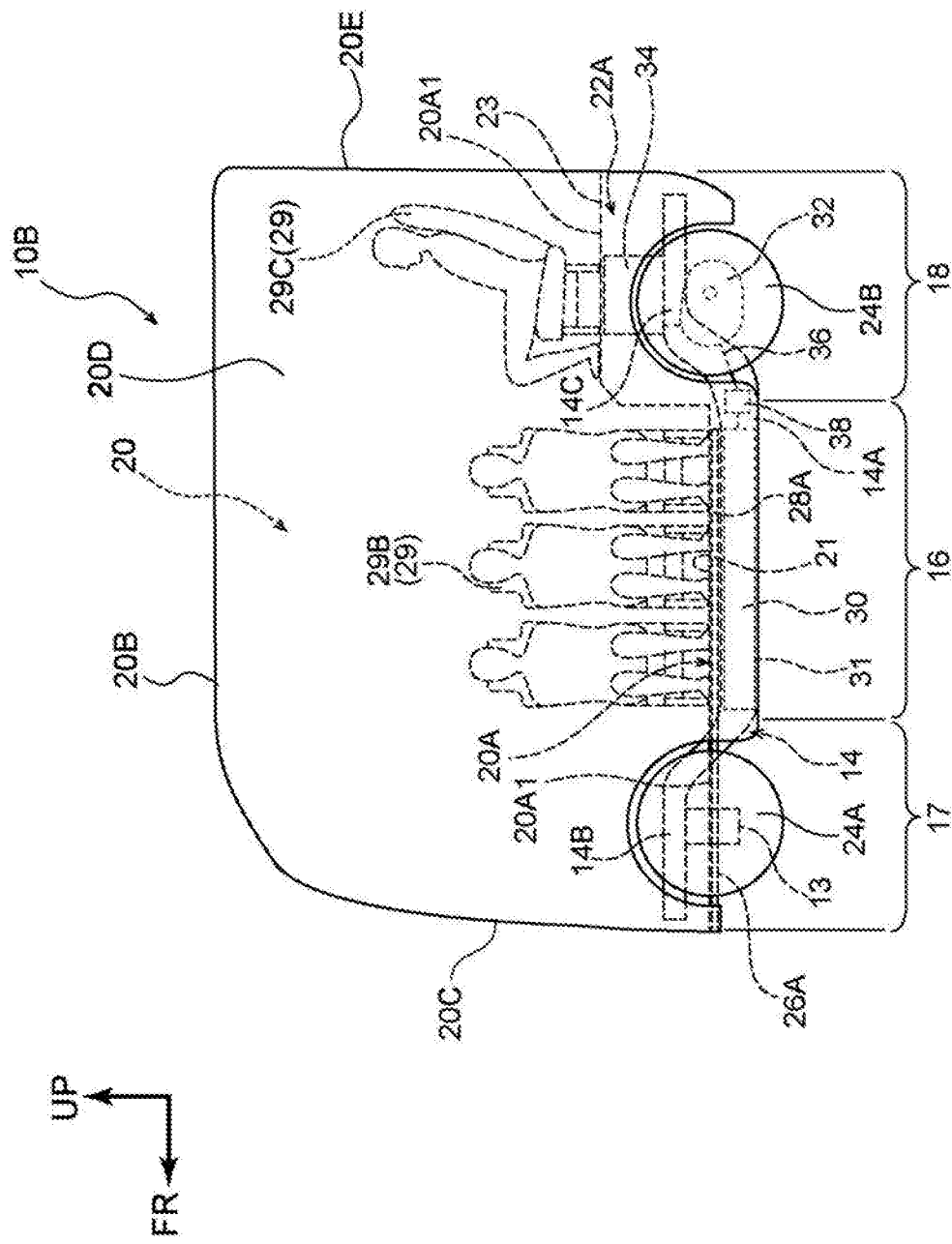
FIG. 6 is a side view of an electric vehicle according to Modified Example 2 of the first embodiment.

The vehicle 10 of the first embodiment includes a plurality of modules coupled together. Thus, the size of the vehicle 10 and the volume of the vehicle cabin 20 can be changed by changing the length of the center module 16 provided at the vehicle center part. For example, as illustrated in FIG. 6, a vehicle 10B of Modified Example 2 of the first embodiment includes a center module 16 that is shorter than the center module 16 of the first embodiment, so that the vehicle 10B of Modified Example 2 is shorter in the vehicle-longitudinal direction than the vehicle 10 of the first embodiment. The vehicle 10B of Modified Example 2 is not provided with the front-row seat 29A, because the length of the vehicle cabin 20 in the vehicle longitudinal direction is reduced. Note that, the front doorway 25 and the side doorway 27 are not illustrated in FIG. 6 (the same also applies to the remaining drawings).

In Modified Example 2, the power cable 36 is connected to the power connector 38 at the junction between the center module 16 and the rear module 18, so that the battery 30 and the drive unit 32 (power unit 34) are electrically connected to each other. For this reason, even when the center module 16 is extended or shortened, the same rear module 18 can be coupled to the center module 16. That is, according to the first embodiment and Modified Example 2 thereof, when vehicles of different sizes are manufactured, it is possible to use the same battery 30 or the same drive unit 32 regardless of the vehicle size. As a result, it is possible to curb an increase in the manufacturing cost.

Figure 7A:
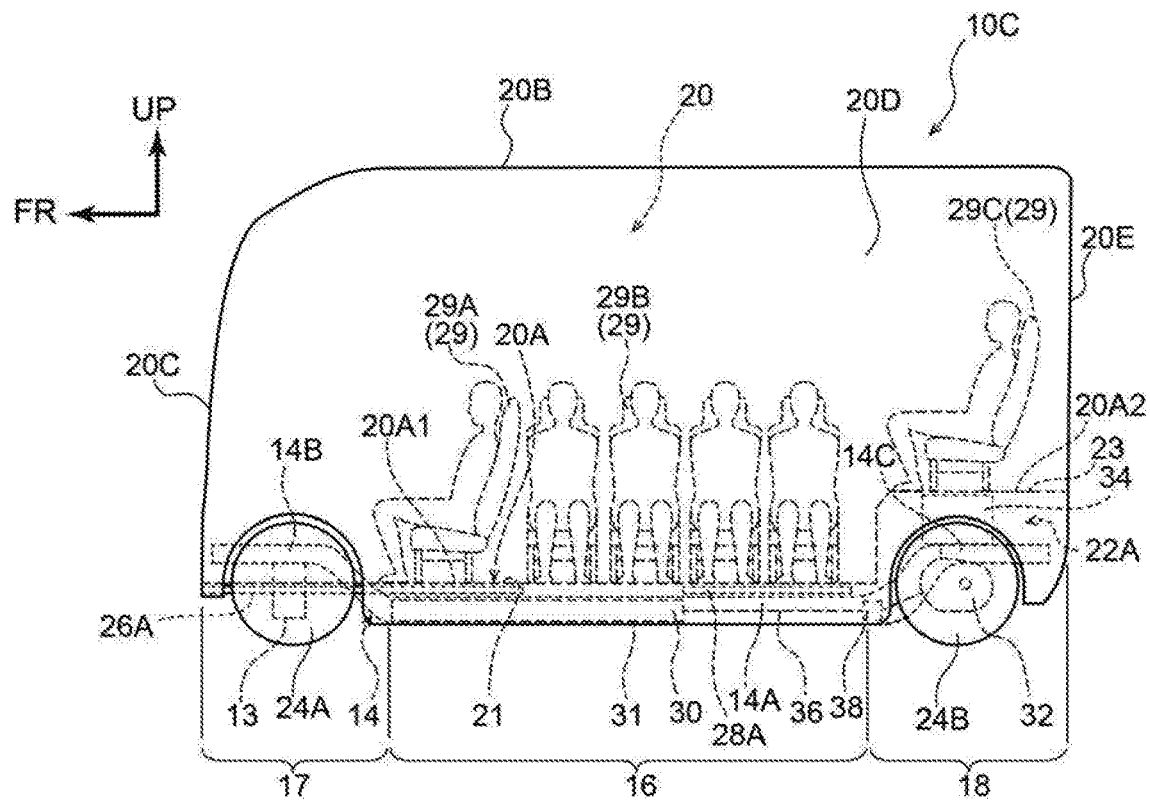
FIG. 7A is a side sectional view of an electric vehicle according to Modified Example 3 of the first embodiment and is a diagram illustrating the arrangement of a battery according to Modified Example 3.

The battery case 31 (the battery 30) need not extend over the entire area of the vehicle center part in the vehicle longitudinal direction. FIG. 7A illustrates a vehicle 10C according to Modified Example 3 of the first embodiment, in which a battery case 31 that is shorter in the vehicle longitudinal direction than the center module 16 is provided at a position close to the front of the vehicle 10C. It is possible to adjust the position of the center of gravity of the vehicle 10 by changing the accommodation position of the battery case 31 provided under the floor of the vehicle cabin 20, as in Modified Example 3. As a result, the same battery 30 or the same drive unit 32 can be used regardless of the vehicle size, and the vehicle 10 can travel stably.

Figure 7B:
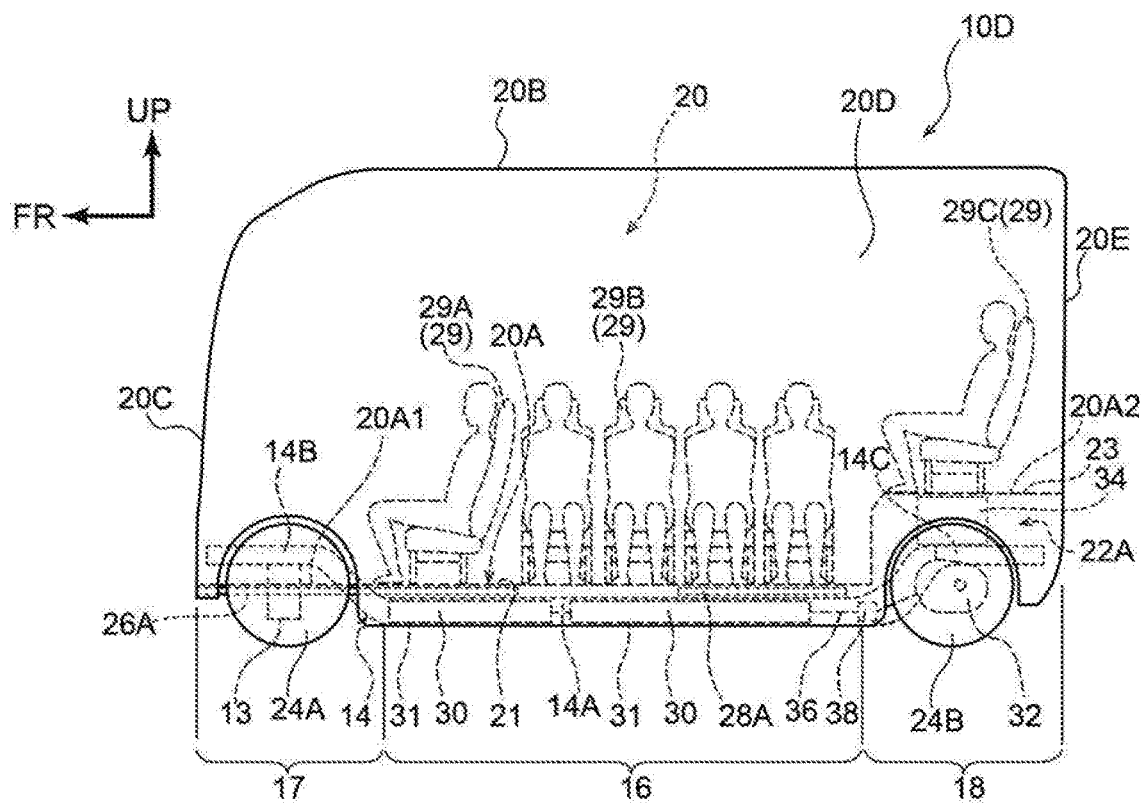
FIG. 7B is a side sectional view of an electric vehicle according to Modified Example 4 of the first embodiment and is a diagram illustrating the arrangement of batteries according to Modified Example 4.

The battery case 31 (the battery 30) to be provided under the floor of the vehicle cabin 20 may be composed of a plurality of battery cases (batteries). FIG. 7B illustrates a vehicle 10D according to Modified Example 4 of the first embodiment, in which the battery case 31 is composed of two battery cases arranged in the vehicle longitudinal direction. When the battery cases having a predetermined length are prepared, there is no need to prepare several kinds of the battery cases 31 depending on the lengths of the center modules 16. For example, when the center module 16 is extended, the number of the battery cases having a predetermined length and to be arranged in the vehicle longitudinal direction is increased, whereas when the center module 16 is shortened, the number of the battery cases having a predetermined length and to be arranged in the vehicle longitudinal direction is decreased. As a result, only one kind of battery case is required for the center modules 16 with various lengths. Consequently, it is possible to trim inventory costs.

Summary of First Embodiment

In the vehicle 10 of the first embodiment, the drive unit 32 is provided in a region included in both the vehicle lower part and the vehicle rear part, and the front doorway 25 is provided in the front wall 20C at the front of the vehicle 10. With this configuration, the vehicle cabin 20 extends from a front end portion of the vehicle 10 to a rear end portion of the vehicle 10. Because the front axle 13 is provided in the vehicle front part, at a position under the floor and near the front wheel 24A, it is not possible to provide the lower floor portion 20A1 at a position lower than the front axle 13. On the other hand, in the vehicle center part, it is possible to provide the lower floor portion 20A1 at a position lower than the front axle 13. However, in this case, a step (level difference) is formed in the lower floor portion 20A1.

In view of this, in the vehicle 10 of the first embodiment, the height of a portion of the lower floor portion 20A1, which is in the vehicle center part, is made equal to the height of a portion of the lower floor portion 20A1, which is in the vehicle front part, and the battery 30 is accommodated under the portion of the lower floor portion 20A1, which is in the vehicle center part and which has a sufficient height. That is, in the vehicle center part, the battery 30 and the center side member 14A serving as a frame member are provided under the lower floor portion 20A1. With this configuration, the floor surface 20A having a flat portion extending from the front doorway 25 to the power unit room 22A is provided. Because the battery 30 is accommodated under the lower floor portion 20A1, the vehicle cabin 20 having a sufficiently wide space is provided.

As described above, according to the first embodiment, it is possible to maximize the space of the vehicle cabin 20 in the vehicle 10 having a box shape while maximizing the area of the lower floor portion 20A1. Further, the vehicle cabin 20 of the first embodiment is configured such that an adult occupant can be in the vehicle cabin 20 in a standing position and can walk around in the vehicle cabin 20. Because the vehicle 10 of the first embodiment is a fully autonomous vehicle, it is not necessary to provide a driver seat and the layout inside the vehicle cabin 20 can be set with a high degree of flexibility. That is, according to the first embodiment, it is possible to accommodate various kinds of equipment to be used for various purposes, such as ride sharing, overnight accommodations, drinking and eating, and retail shops, in a wide space with a flat and low floor and a box shape according to barrier free design. Note that the vehicle 10 according to the first embodiment is suitable for an autonomous driving bus.

The vehicle 10 of the first embodiment includes the front doorway 25 provided at the front of the vehicle 10, so that it is possible to access the vehicle 10 from a roadway. Further, the side doorway 27 is provided at the lateral side of vehicle 10, so that it is possible to access the vehicle 10 not only from a roadway but also from a sidewalk.

The front doorway 25 may be provided with the front slope 26 configured to extend from the lower floor portion 20A1 toward a roadway. Similarly, the side doorway 27 may be provided with the side slope 28 configured to extend from the lower floor portion 20A1 toward a sidewalk. That is, according to the first embodiment, there is no step (level difference) between a road surface and the floor of the vehicle cabin 20. This enables a person in a wheeled chair to easily get on and off the vehicle 10 and facilitates loading and unloading of luggage or a trolley. Particularly, the vehicle 10 of the first embodiment is provided with the doorways at two positions, that is, at the front side and the lateral side of the vehicle 10. This enables a person in a wheeled chair to easily get on and off the vehicle 10 and facilitates loading and unloading of luggage or a trolley, in a road on which the vehicle 10 can travel, regardless of whether the road is provided with an elevated sidewalk. Note that, instead of the slope, an elevator may be provided at each of the front doorway 25 and the side doorway 27.

In the first embodiment, the front slope 26 and the side slope 28 are accommodated at such positions that the front slope 26 and the side slope 28 do not overlap with each other in a plan view. If the front slope 26 and the side slope 28 are accommodated at such positions that the front slope 26 and the side slope 28 overlap with each other in a plan views the lower floor portion 20A1 need to be raised or the height of each of the center side member 14A and the battery case 31 accommodating the battery 30 need to be decreased in the vehicle-height direction. In contrast to this, in the vehicle 10 of the first embodiment, the side slope 28 is accommodated at such a position that the side slope 28 does not overlap with the front slope 26 in a plan view. It is therefore possible to achieve both a decrease in the height of the lower floor portion 20A1 and an increase in the capacity of the battery 30.

Further, in the vehicle 10 of the first embodiment, the autonomous driving unit 40 and the sensors 42 are each provided at the vehicle front part or at the vehicle upper part, and the battery 30, the power cable 36, the power unit 34, and the drive unit 32 are each provided in a region included in both the vehicle lower part and the vehicle center or tear part. That is, in the first embodiment, the autonomous driving unit 40 and the sensors 42 related to autonomous driving are provided at positions distant from the battery 30, the power cable 36, the power unit 34, and the drive unit 32 that are power components through which a high-voltage current flows. According to the first embodiment, the influence of electromagnetic wave noise, which is generated from the power components, on the autonomous driving unit 40 and the sensors 42 can be reduced.

Further, the signal cable 46 that connects the autonomous driving unit 40 to each sensor 42 is provided to be routed from the vehicle front side to the vehicle upper side, so that the signal cable 46 is provided at a position distant from the power components. That is, according to the first embodiment, the signal cable 46 that is easily influenced by noise is provided at a position distant from the power components, whereby the influence of electromagnetic wave noise, which is generated from the power components, on an autonomous driving control signal can be reduced.

The vehicle 10 of the first embodiment is manufactured by assembling a plurality of modules together, in the vehicle 10 of the first embodiment, the drive unit 32 is provided in one of the front module 17 and the rear module 18, and the autonomous driving unit 40 is provided in the other one of the front module 17 and the rear module 18. On the other hand, because the accommodation position and accommodation shape of the battery 30 can be set with a high degree of flexibility, the battery 30 can be applied to the center modules 16 with various lengths. In the first embodiment, for example, by preparing a plurality of kinds of center modules, one kind of front module, and one kind of rear module, it is possible to manufacture vehicles with different sizes. Specifically, as described in Modified Example 2, it is possible to change the size of the vehicle by preparing the center modules 16 with different lengths in the vehicle longitudinal direction and preparing the front module 17 and the rear module 18, which are the same as those in the first embodiment.

As described above, with the configuration of the vehicle 10 of the first embodiment, it is possible to change the vehicle length of the electric vehicle that can perform autonomous driving. That is, it is possible to easily manufacture a plurality of kinds of vehicles with different lengths. Further, according to the first embodiment, the power connector 38 that electrically connects the battery 30 and the drive unit 32 to each other is provided at the junction between the center module 16 and the rear module 18. For this reason, it is possible to decrease the number of process steps and improve the production efficiency in manufacturing of vehicles with different sizes.

Alternatively, the length of the center module may be fixed to be uniformed, and a plurality of front modules with different lengths in the vehicle longitudinal direction or a plurality of rear modules with different lengths in the vehicle longitudinal direction may be prepared, whereby vehicles with different sizes are manufactured.

The vehicle 10 of the first embodiment is a modularized vehicle. However, regarding vehicles manufactured by assembling components together without being modularized, it is possible to easily manufacture vehicles with different sizes. For example, the vehicles 10 with different lengths in the vehicle longitudinal direction can be easily manufactured by preparing, for example, the center side members 14A with different lengths, the side walls 20D with different lengths, the floor panels 21 with different lengths, and the battery cases 31 with different lengths.

Second Embodiment

A vehicle 100 of a second embodiment is different front the vehicle 10 of the first embodiment, in that, in addition to the drive unit 32 and the power unit 34, the autonomous driving unit 40 is provided in the vehicle rear part of the vehicle 100. Hereinafter, the differences from the first embodiment will be mainly described. Note that, the same reference signs will be given to the same components as those of the first embodiment.

Figure 8:
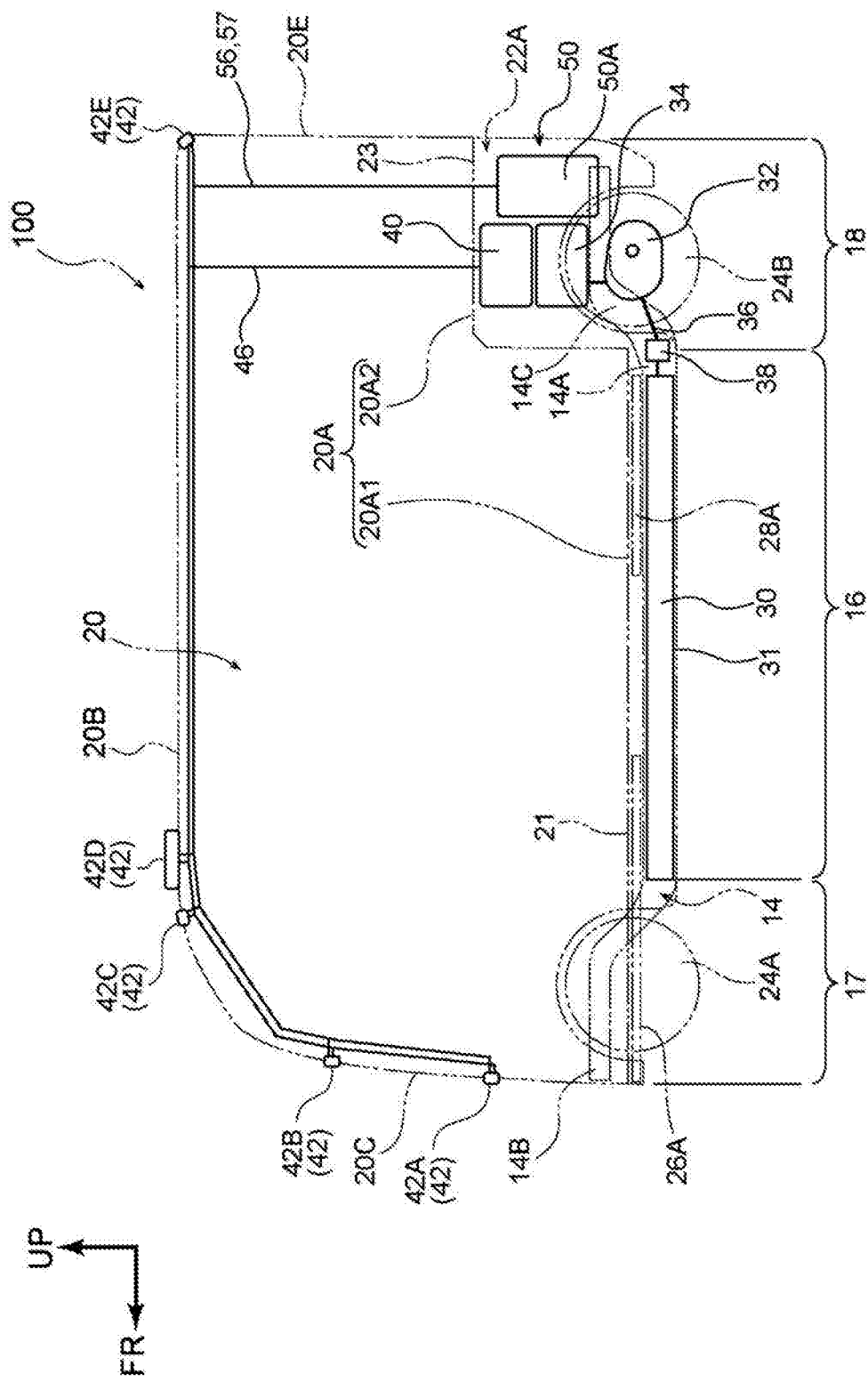
FIG. 8 is a side sectional view of an electric vehicle according to a second embodiment and is a diagram illustrating devices related to autonomous driving.

As illustrated in FIG. 8, in the vehicle 100 of the second embodiment, the drive unit 32, the power unit 34, the autonomous driving unit 40, and a main body portion 50A of a cleaning unit 50 are accommodated in the power unit room 22A.

In the second embodiment, because the autonomous driving unit 40 is provided at the vehicle rear part, the signal cable 46 that connects the autonomous driving unit 40 to each sensor 42 is provided to be routed from the vehicle rear side toward the vehicle front side. Specifically, the signal cable 46 extending upward from the autonomous driving unit 40 is first connected to the rear sensor 42E, extends forward along the roof 20B, and is then connected to the upper sensor 42D. Then, the signal cable 46 is connected to the upper sensor 42C and the front sensors 42B, 42A.

The cleaning unit 50 is a device that maintains the autonomous driving performance by removing dirt from the sensor surfaces of the sensors 42 using a cleaning liquid and compressed air. The cleaning unit 50 includes the main body portion 50A including a control unit configured to control a cleaning timing and a cleaning operation and a reservoir tank storing a cleaning liquid. Further, the cleaning unit 50 includes a liquid pipe 56 through which a cleaning liquid is supplied from the main body portion 50A toward each sensor 42 and an air pipe 57 through which compressed air is supplied. Even if the vehicle 100 does not include the cleaning unit 50, autonomous driving is not immediately disturbed. For this reason, the main body portion 50A accommodated in the power unit room 22A is classified as an accessory component.

Figure 9:
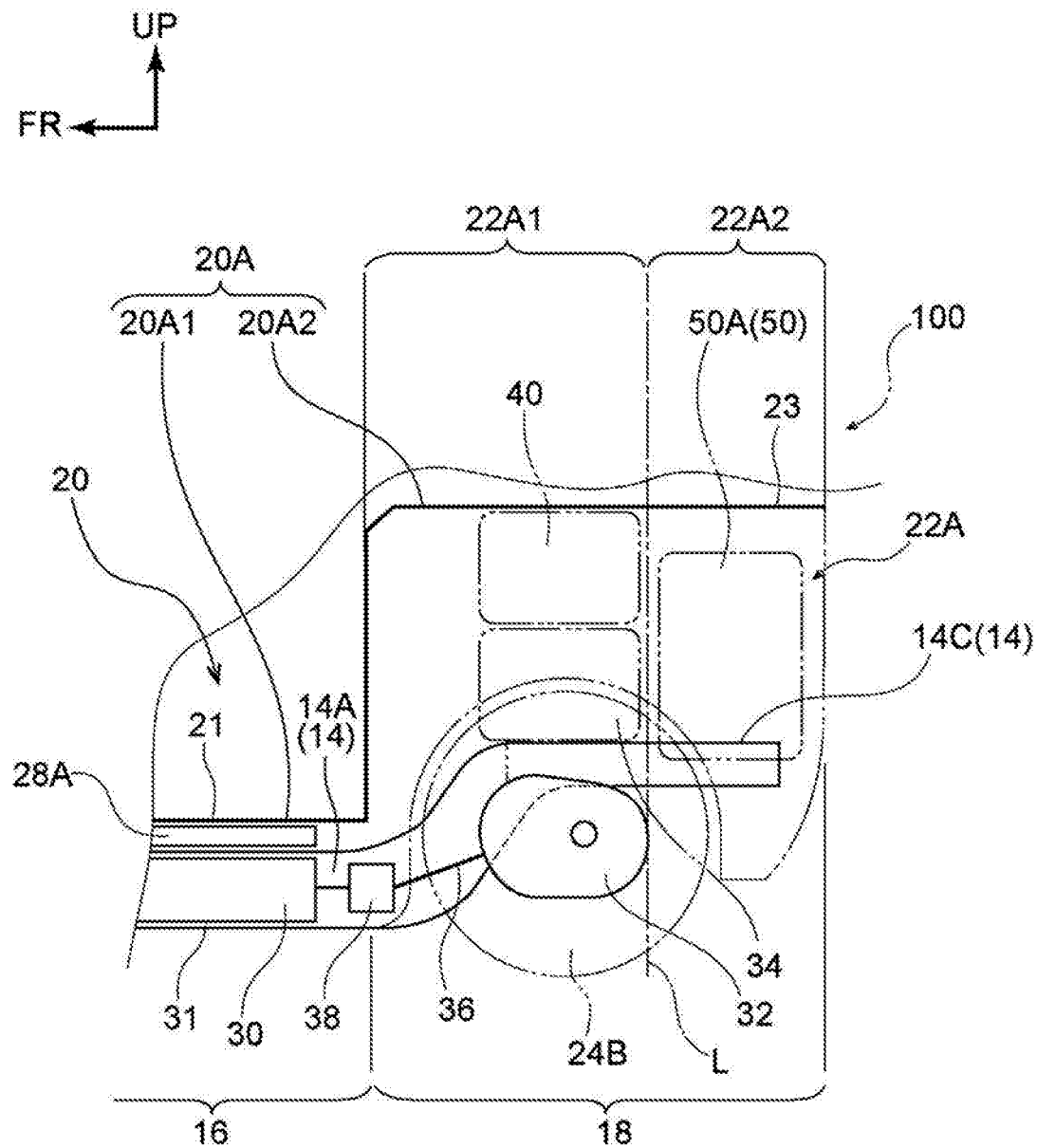
FIG. 9 is an enlarged view of a power unit room in the second embodiment (an enlarged view of FIG. 8)

As illustrated in FIG. 9, in the power unit room 22A of the second embodiment, an area forward of a rear end (see a line L of FIG. 9) of the drive unit 32 is set as a protection area 22A1, and, in addition to the drive unit 32, the power unit 34 and the autonomous driving unit 40 are provided in the protection area 22A1. When the vehicle 100 traveling backward collides with an obstacle or the like or when the vehicle 100 gets rear-ended, the drive unit 32 provided with a metallic ease functions as an impact-resistant portion that prevents deformation of the vehicle 100.

Further, in the power unit room 22A, an area rearward of the rear end (see the line L of FIG. 9) of the drive unit 32 is set as a crash area 22A2, and the main body portion 50A is provided in the crash area 22A2. In the second embodiment, because the main body portion 50A is provided outside the vehicle cabin 20 instead of being provided inside the vehicle cabin 20, the space of the vehicle cabin 20 can be kept sufficiently wide. With this configuration, when the vehicle 100 traveling backward collides with an obstacle or the like or when the vehicle 100 gets rear-ended, structures provided in the crash area 22A2, such as the main body portion 50A, crash. Thus, an impact applied to the vehicle 100 is absorbed.

In the second embodiment, the power cable 36, the power unit 34, and the drive unit 32 serving as power components through which a high-voltage current flows are provided in the protection area 22A1. With this configuration, it is possible to ensure the safety against electric leakage even when a collision of the vehicle 100 occurs or even when the vehicle 100 gets rear-ended. The power components are provided in the protection area 22A1 and the main body portion 50A of the cleaning unit 50 is provided in the crash area 22A2. With this configuration, the degree of damage that is given to the vehicle 100 due to a collision of the vehicle 100 or a rear-end collision of the vehicle 100 is limited within a range of degrees at which the vehicle 100 can keep traveling. Because the autonomous driving unit 40 is provided in the protection area 22A1, the vehicle 100 can keep traveling in an autonomous traveling mode even when a collision of the vehicle 100 occurs. According to the second embodiment, even when a collision of the vehicle 100 occurs, the vehicle 100, which is a fully autonomous vehicle that does not require a driver seat, can keep traveling to a safe place in order to avoid further danger.

Figure 10:
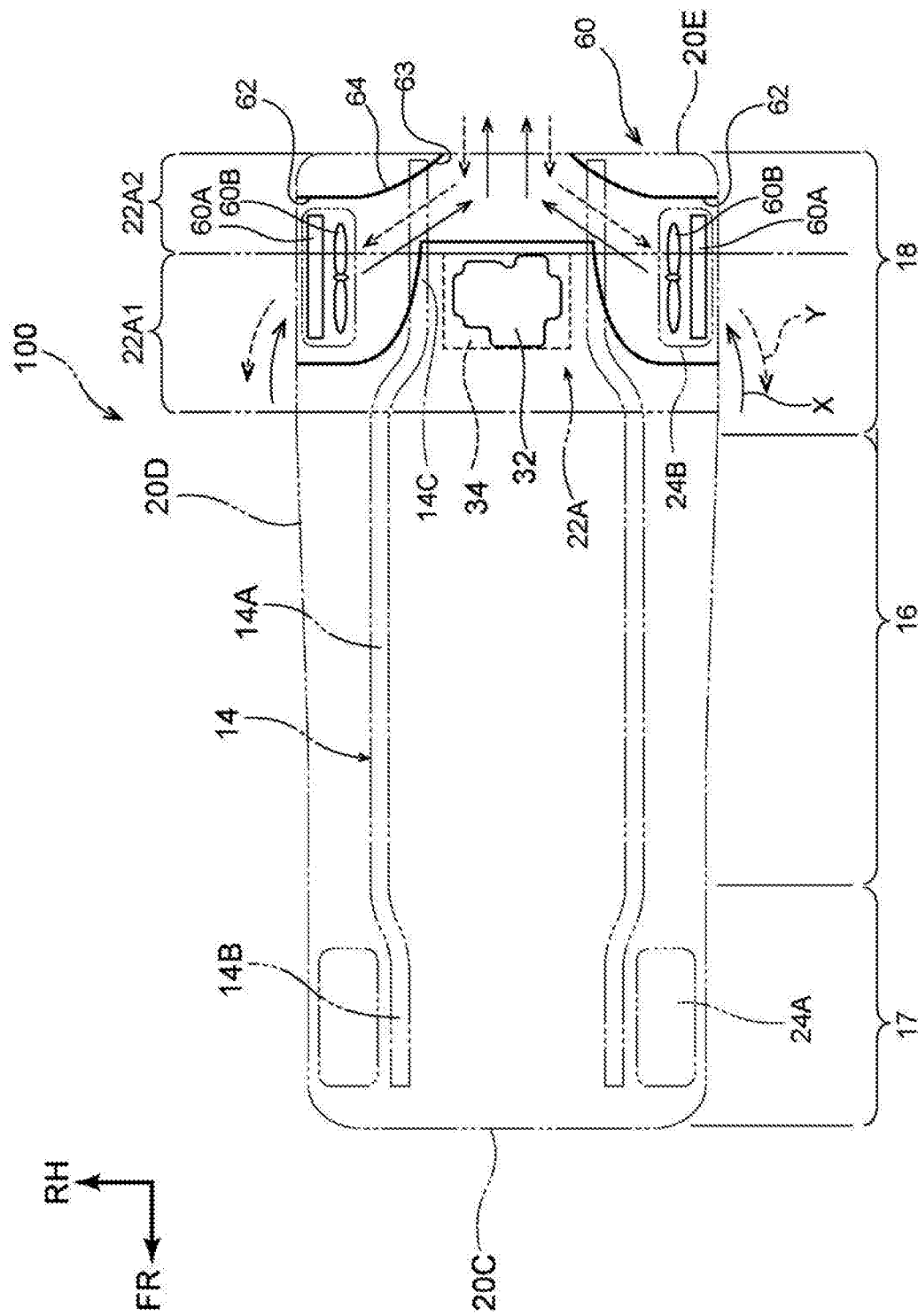
FIG. 10 is a plan sectional view of the electric vehicle according to the second embodiment and is a diagram illustrating a cooling device.

As illustrated in FIG. 10, a cooling device 60 configured to cool the drive unit 32 and so forth is provided in an upper region within the power unit room 22A of the second embodiment. The cooling device 60 of the vehicle 100 of the second embodiment includes a pair of radiators 60A and a pair of fans 60B. Each fan 60B is a blast fan. One of the radiators 60A is provided on the right side in the vehicle-width direction, and the other one of the radiators 60A is provided on the left side in the vehicle-width direction. Each fan 60B is provided inward of a corresponding one of the radiators 60A in the vehicle-width direction.

Further, an opening 62 is provided in the side wall 20D, at a position outward of each radiator 60A in the vehicle-width direction, and a rear grille 63 serving as a ventilation hole is provided in the rear wall 20E, at a position rearward of the radiators 60A. The power unit room 22A is provided with ducts 64 that guide air from the rear grille 63 to the openings 62 provided respectively on the right and left sides in the vehicle-width direction.

In the second embodiment, the direction of the air flowing through the duct 64 is controlled by changing the rotation direction of the fan 60B. For example, when the fan 60B is rotated in the positive direction, the flow of air is directed from the opening 62 toward the rear grille 63 (see an arrowed solid line X). On the other hand, when the fan 60B is rotated in the reverse direction, the flow of air is directed from the rear grille 63 toward the opening 62 (see an arrowed dotted line Y).

The vehicle 100 of the second embodiment is a fully autonomous vehicle that does not require a driver seat, and can travel in either of the two directions, that is, the forward direction and backward direction. In the second embodiment, when the vehicle 100 is traveling forward, the air comes out of the rear grille 63, so that an airstream hits each radiator 60A. On the other hand, when the vehicle 100 is traveling backward, the air is introduced through the rear grille 63, so that an airstream hits each radiator 60A. That is, according to the second embodiment, the cooling device 60 can perform a cooling operation regardless of whether the vehicle 100 is traveling forward or backward. However, in the second embodiment, the rotation of each fan 60B is changed depending on the traveling direction of the vehicle 100 in order to maintain sufficient cooling performance regardless of the amount or direction of an airstream.

For example, when the vehicle 100 is traveling forward, the fans 60B are rotated in the positive direction, so that the air is taken from the openings 62 provided in the side walls 20D to cool the radiators 60A and then the air heated through heat exchange is discharged from the rear grille 63 provided in the rear wall 20E (see arrowed solid lines X). On the other hand, when the vehicle 100 is traveling backward, the fans 60B are rotated in the reverse direction, so that the air is taken from the rear grille 63 provided in the rear wall 20E to cool the radiators 60A and then the air heated through heat exchange is discharged from the openings 62 provided in the side walls 20D (see arrowed dotted lines Y).

As described above, with the cooling device 60 of the second embodiment, in the vehicle 100 that is not provided with a driver seat and that can travel in either of the two directions, that is, the forward direction and backward direction, the same cooling performance can be achieved by the minimum number of radiators regardless of whether the vehicle 100 is traveling forward or backward.

In the vehicle 100 of the second embodiment, the radiators 60A and the fans 60B are provided so as to straddle the boundary between the protection area 22A1 and the crash area 22A2. Thus, when a collision of the vehicle 100 occurs or when the vehicle 100 gets rear-ended, the radiator 60A and the fan 60B may be damaged. However, even when the cooling device 60 does not function properly, the vehicle 100 can keep traveling for a short period of time and move to a safe place.

In the second embodiment, the radiators 60A are provided respectively on the right and left sides in the power unit room 22A in the vehicle-width direction. However, the arrangement of the radiators is not limited to this. For example, the radiator may be provided on only one of the right and left sides in the vehicle-width direction, or three or more radiators may be provided.

Third Embodiment

A vehicle 110 of a third embodiment has a configuration in which an air conditioning system 70 is added to the vehicle 10 of the first embodiment. Hereinafter, the differences from the first embodiment will be mainly described. Note that, the same reference signs will be given to the same components as those of the first embodiment.

Figure 11:
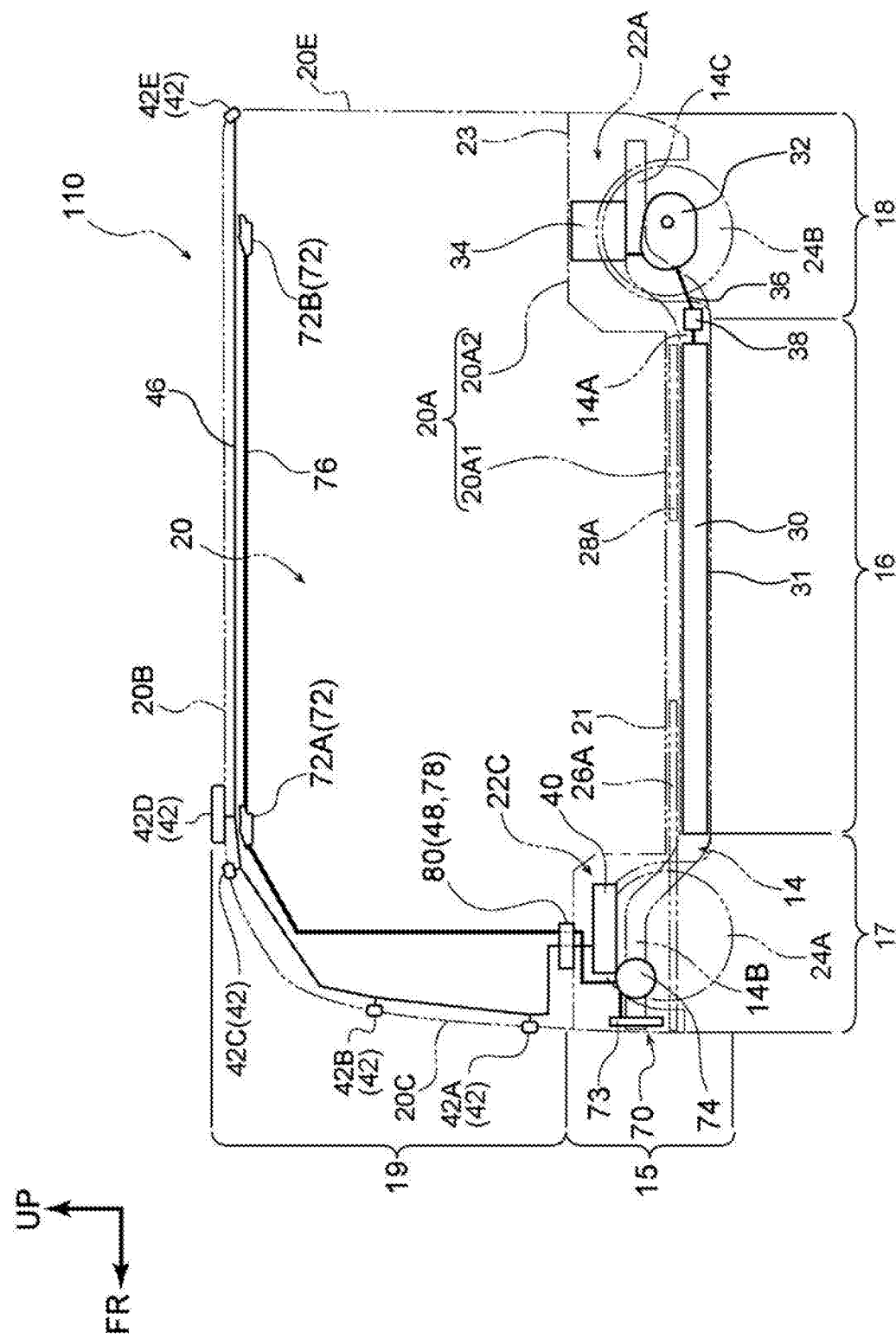
FIG. 11 is a side sectional view of an electric vehicle according to a third embodiment and is a diagram illustrating devices related to autonomous driving and an air conditioning system.

As illustrated in FIG. 11, in the vehicle 110 of the third embodiment, a floor module 15, which is a vehicle lower part constituting a vehicle lower portion, is composed of the center module 16, the front module 17, and the rear module 18. Further, the vehicle 110 includes a roof module 19, which is a vehicle upper part constituting a vehicle upper portion provided above the floor module 15. The vehicle 110 of the third embodiment is manufactured by assembling the center module 16, the front module 17, and the rear module 18 into the floor module 15 and then coupling the roof module 19 to the floor module 15.

The air conditioning system 70 of the third embodiment includes heating and ventilating air conditioning (HVAC) units 72, each of which is an indoor unit configured to control the air inside the vehicle cabin 20, a condenser 73 for heat exchange, and a compressor 74 configured to compress a refrigerant.

The HVAC units 72 include a first HVAC unit 72A that is provided at a front portion of the roof 20B and a second HVAC unit 72B that is provided at a rear portion of the roof 20B. The condenser 73 and the compressor 74 are accommodated in a sub-unit room 22C provided in a region included in both the vehicle lower part and the vehicle front part. In the third embodiment, a step (level difference) due to the sub-unit room 22C is provided in a part of the lower floor portion 20A1.

A heat exchanger in each HVAC unit 72, the condenser 73, and the compressor 74 are connected to each other by refrigerant piping 76, which is piping. Further, a piping connector 78 configured to place the refrigerant piping 76 in a connected state or a disconnected state is provided above the sub-unit room 22C. In the third embodiment, the refrigerant piping 76, which is a set of pipes, extends upward from the piping connector 78 toward the first HVAC unit 72A and then the refrigerant piping 76 extends rearward from the first HVAC unit 72A toward the second HVAC unit 72B. The refrigerant piping 76 is provided in a gap between an interior material and a panel that are included in the side wall 20D and a gap between the interior material and the roof panel that are included in the roof 20B.

Figure 12B:
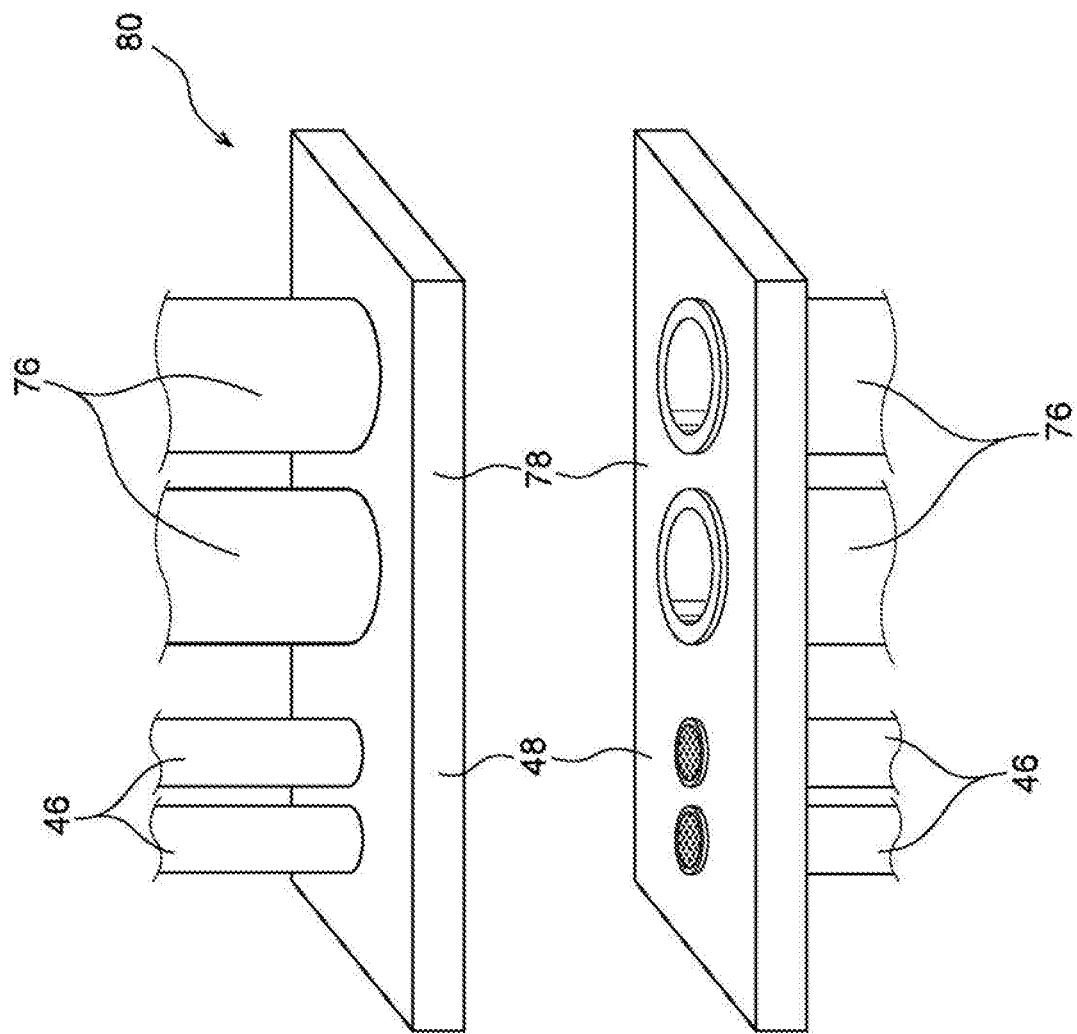
FIG. 12B is a perspective view of a composite connector in the electric vehicle according to the third embodiment.
Figure 12A:
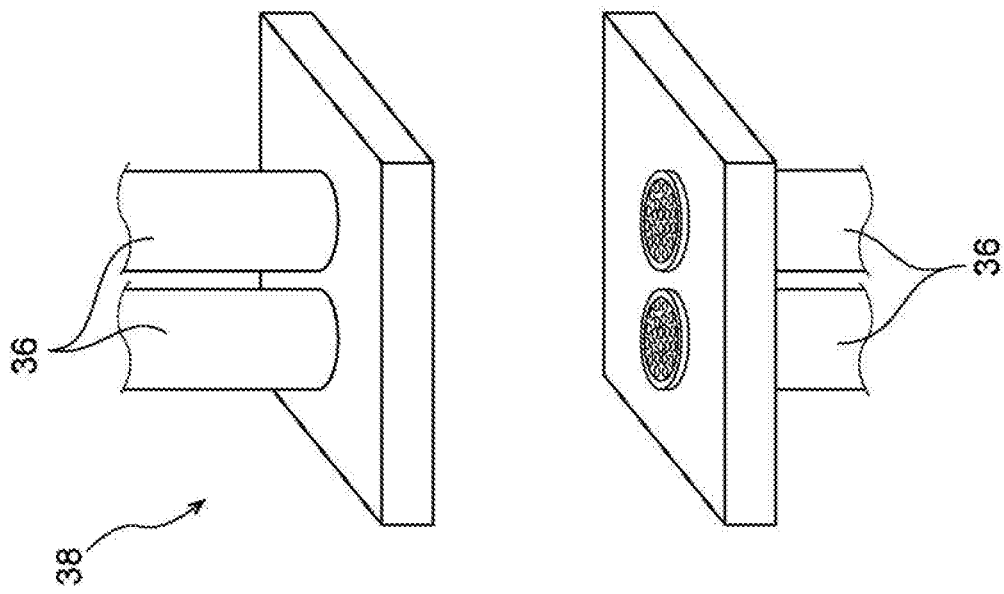
FIG. 12A is a perspective view of a power connector in the electric vehicle according to the third embodiment.

In the third embodiment, in addition to the condenser 73 and the compressor 74, the autonomous driving unit 40 is accommodated in the sub-unit room 22C. Further, a signal connector 48 configured to place the signal cable 46 in a connected state or a disconnected state is provided above the sub-unit room 22C. As illustrated in FIG. 12B, the signal connector 48 and the piping connector 78 of the third embodiment are provided as a composite connector 80 which is an integrated common connector. The composite connector 80 is provided at a junction between the front module 17 and the roof module 19. In the third embodiment, a plurality of the signal cables 46 and a plurality of pieces of the refrigerant piping 76 can be collectively placed in a connected state by the composite connector 80. Note that, as illustrated in FIG. 12A, the power connector 38 is provided independently of the composite connector 80.

In the third embodiment, the autonomous driving unit 40, the condenser 73, and the compressor 74 are provided in the front module 17 at the vehicle front part, and the power unit 34 and the drive unit 32 are provided in the rear module 18 at the vehicle rear part. Because the accommodation position and accommodation shape of the battery 30 can be set with a high degree of flexibility, the battery 30 can be applied to the center modules 16 with various lengths. Therefore, according to the third embodiment, it is possible to change the length of the electric vehicle that includes the air conditioning system 70 and that can perform autonomous driving. That is, it is possible to easily manufacture a plurality of kinds of vehicles with different lengths.

In the third embodiment, the signal cable 46 that connects the autonomous driving unit 40 and each sensor 42 to each other and the refrigerant piping 76 that connects the condenser 73 and the compressor 74 to the HVAC units 72 are provided on the same path. Thus, with the configuration of the vehicle 110 of the third embodiment, the signal cable 46 and the refrigerant piping 76 can be efficiently routed. Further, it is possible to easily manufacture vehicles with different lengths by changing the length of each of the signal cable 46 and the refrigerant piping 76.

In the vehicle 110 of the third embodiment, a camera as the sensor 42 is provided in the vehicle front part. The camera is provided in the vehicle front part in order to recognize a traffic signal. If the autonomous driving unit 40 is provided in the vehicle rear part, it is necessary to lengthen the signal cable 46 that connects the camera to the autonomous driving unit 40. In contrast to this, according to the third embodiment, because both the camera and the autonomous driving unit 40 are provided in the vehicle front part, the signal cable 46 connecting the camera and the autonomous driving unit 40 to each other can be shortened.

In the third embodiment, in manufacturing of the vehicle 110, each sensor 42, the signal cable 46, each HVAC unit 72, and the refrigerant piping 76 are installed in advance in the roof module 19, and the autonomous driving unit 40, the condenser 73, and the compressor 74 are installed in advance in the floor module 15. Then, the roof module 19 is coupled to the floor module 15, so that an autonomous driving system and the air conditioning system 70 are formed. That is, according to the third embodiment, because it is possible to form each of the systems constituting the vehicle 110 along with a vehicle body, it is possible to efficiently manufacture the vehicle 110. Particularly, in the third embodiment, the signal connector 48 and the piping connector 78 are integrated into the composite connector 80. For this reason, it is possible to decrease the number of process steps and improve the production efficiency in manufacturing of vehicles with different sizes.

In the third embodiment, the signal connector 48 and the piping connector 78 are integrated into the composite connector 80 provided at the junction between the floor module 15 and the roof module 19. Thus, it is possible to easily replace the roof module 19. According to the third embodiment, it is possible to promptly cope with differences in specification of the roof module 19 and differences in the manner of providing the roof module 19 at low cost.

Fourth Embodiment

A vehicle 120 of a fourth embodiment is different from the vehicle 110 of the third embodiment in the arrangement of the air conditioning system 70. Hereinafter, the differences from the third embodiment will be mainly described. Note that, the same reference signs will be given to the same components as those of the first embodiment and the third embodiment.

As illustrated in FIG. 13, in addition to the drive unit 32 and the power unit 34, the condenser 73 and the compressor 74 of the fourth embodiment are accommodated in the power unit room 22A provided in a lower region of the rear module 18. Further, the piping connector 78 configured to place the refrigerant piping 76 in a connected state or a disconnected state is provided above the power unit room 22A.

In the fourth embodiment, the refrigerant piping 76, which is a set of pipes, extends upward from the piping connector 78 toward the second HVAC unit 72B, and then the refrigerant piping 76 extends forward from the second HVAC unit 72B toward the first HVAC unit 72A. The refrigerant piping 76 is provided in a gap between the interior material and the panel that are included in the side wall 20D and a gap between the interior material and the roof panel that are included in the roof 20B.

In the fourth embodiment, the autonomous driving unit 40 is accommodated in the projection portion 22B of the front module 17. The signal connector 48 is provided above the projection portion 22B. In the fourth embodiment, the signal connector 48 and the piping connector 78 are connectors that are independent of each other. The signal connector 48 is provided at a junction between the front module 17 and the roof module 19, and the piping connector 78 is provided at a junction between the rear module 18 and the roof module 19.

The vehicle 120 of the fourth embodiment provides operations and effects similar to those of vehicle 110 of the third embodiment.

Fifth Embodiment

A vehicle 130 of a fifth embodiment is different from the vehicle 120 of the fourth embodiment, in the arrangement of the autonomous driving unit 40. Hereinafter, the differences from the fourth embodiment will be mainly described. Note that, the same reference signs will be given to the same components as those of the first embodiment and the fourth embodiment.

Figure 14:
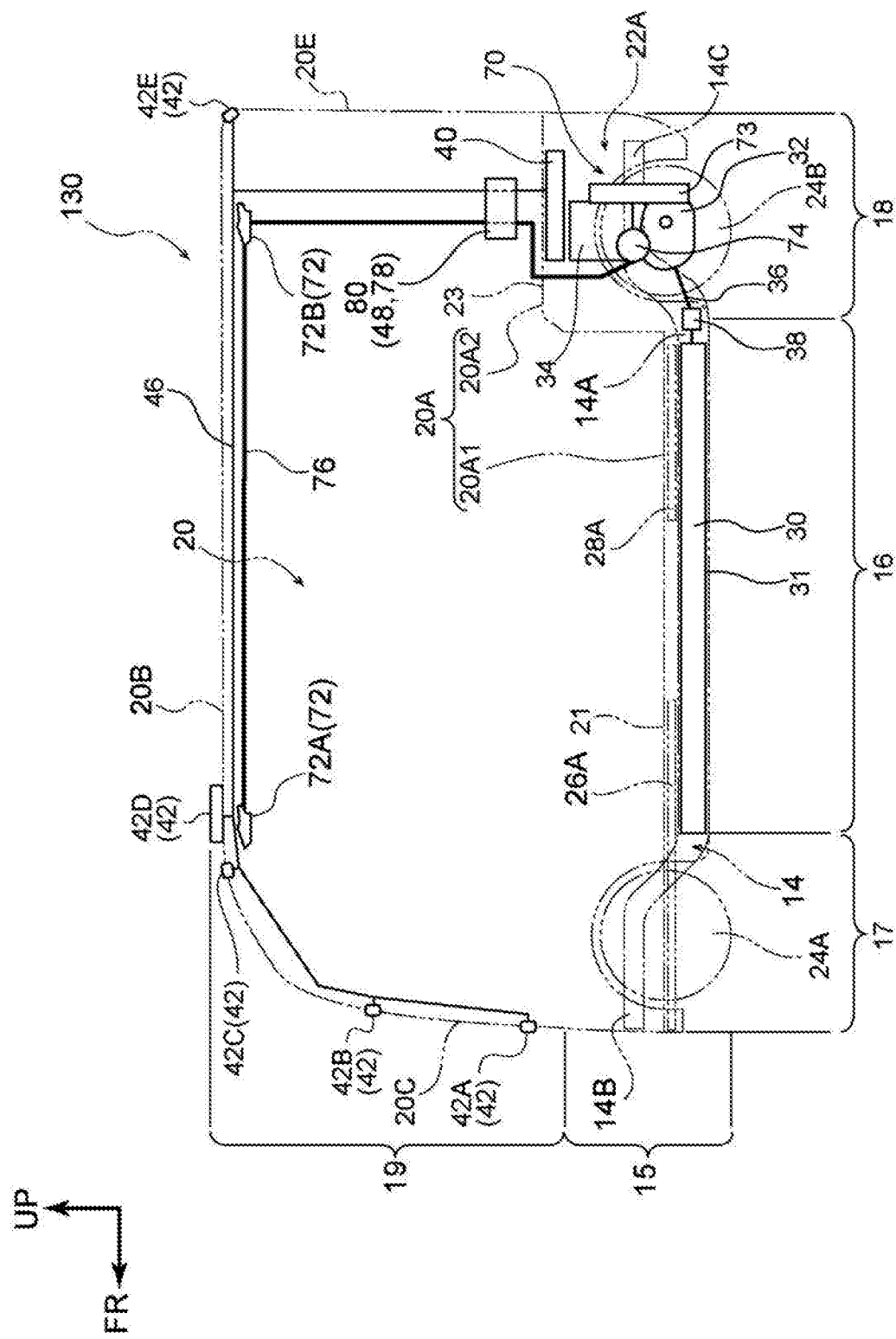
FIG. 14 is a side sectional view of an electric vehicle according to a fifth embodiment and is a diagram illustrating devices related to autonomous driving and an air conditioning system.

As illustrated in FIG. 14, in addition to the drive unit 32, the power unit 34, the condenser 73, and the compressor 74, the autonomous driving unit 40 of the fifth embodiment is accommodated in the power unit room 22A provided in the vehicle rear part. Further, the composite connector 80 that is an integrated connector including the signal connector 48 and the piping connector 78 is provided above the power unit room 22A.

In the fifth embodiment, the signal cable 46 that connects the autonomous driving unit 40 to each sensor 42 is routed from the vehicle rear side toward the vehicle front side. Specifically, the signal cable 46 extending upward from the autonomous driving unit 40 is first connected to the rear sensor 42E via the signal connector 48, extends forward along the roof 20B, and is connected to the upper sensor 42D. Further, the signal cable 46 is connected to the upper sensor 42C and the front sensors 42B, 42A.

The vehicle 130 of the fifth embodiment provides operations and effects similar to those of vehicle 110 of the third embodiment and the vehicle 120 of the fourth embodiment.

Modified Example of Fifth Embodiment

In the fifth embodiment, the drive unit 32 and the power unit 34 are accommodated in the power unit room 22A in the rear module 18. Alternatively, in a modified example of the fifth embodiment, the power unit 34 is provided in the roof module 19. In this modified example, in addition to the signal connector 48 and the piping connector 78, the power connector 38 is provided at a junction between the rear module 18 and the roof module 19.

Note that, the signal connector 48, the piping connector 78, and the power connector 38 may be integrated depending on a purpose. For example, as illustrated in FIG. 12A and FIG. 12B, the power connector 38 may be an independent connector and the signal connector 48 and the piping connector 78 may be integrated into the composite connector 80. By isolating the signal connector 48 and the signal cable 46 from the power connector 38 through which a high-voltage current flows, it is possible to reduce the influence of noise on the autonomous driving unit 40.

Figures 15A, 15B:
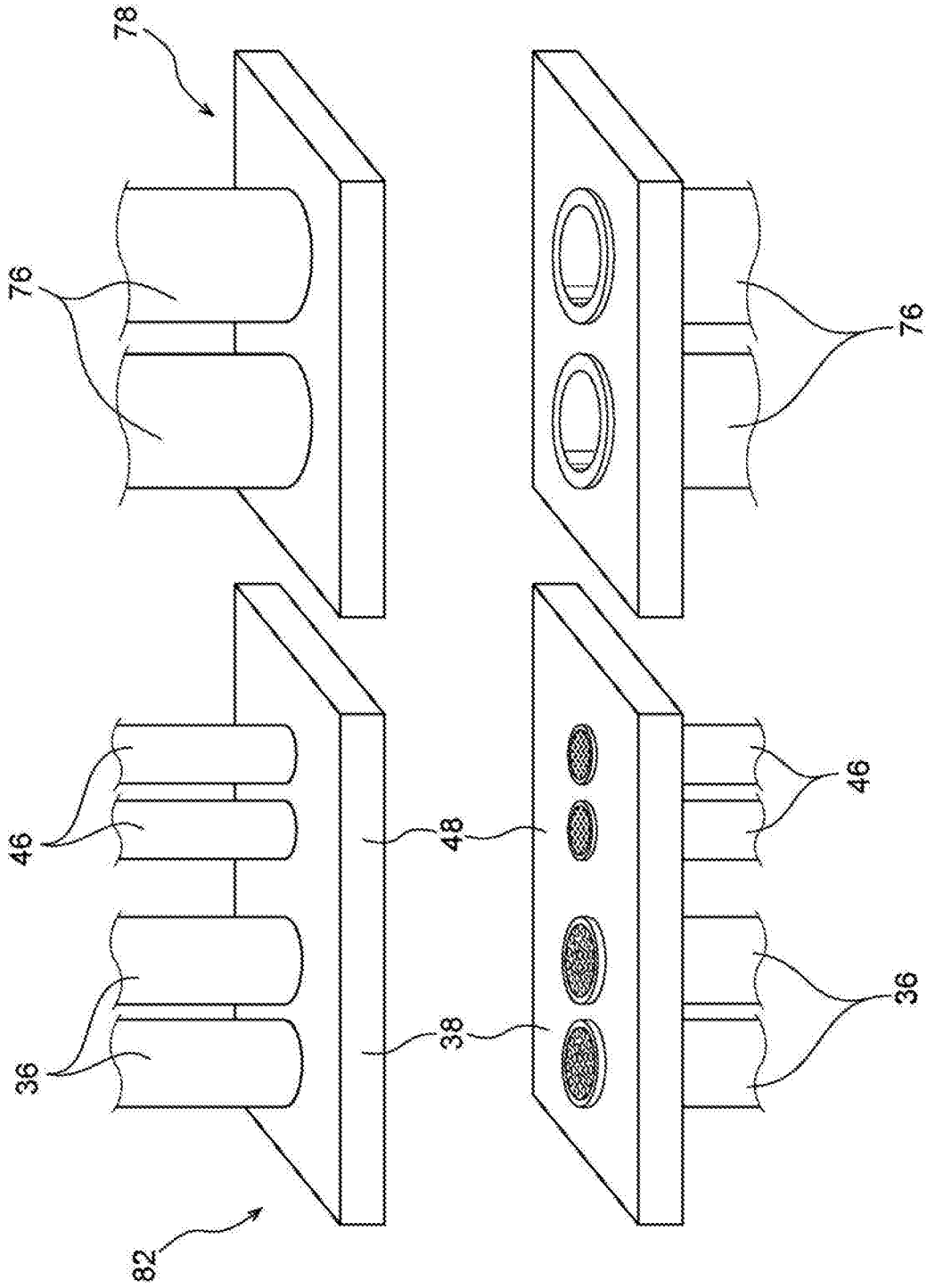
FIG. 15A is a perspective view of a composite connector in a modified example of the fifth embodiment.
FIG. 15B is a perspective view of a piping connector in the modified example of the fifth embodiment.

For example, as illustrated in FIG. 15A and FIG. 15B, the power connector 38 and the signal connector 48 may be integrated into a composite connector 82 which is an integrated common connector, and the piping connector 78 may be an independent connector. Because the flexibility of the refrigerant piping 76 is lower than that of the power cable 36 and the signal cable 46, the assembling property is improved by separating the piping connector 78 from the composite connector 82. For example, in manufacturing of vehicles, the work efficiency is improved when the piping connector 78 for the refrigerant piping 76 having a low flexibility is coupled and then the composite connector 82 is coupled.

Figure 16:
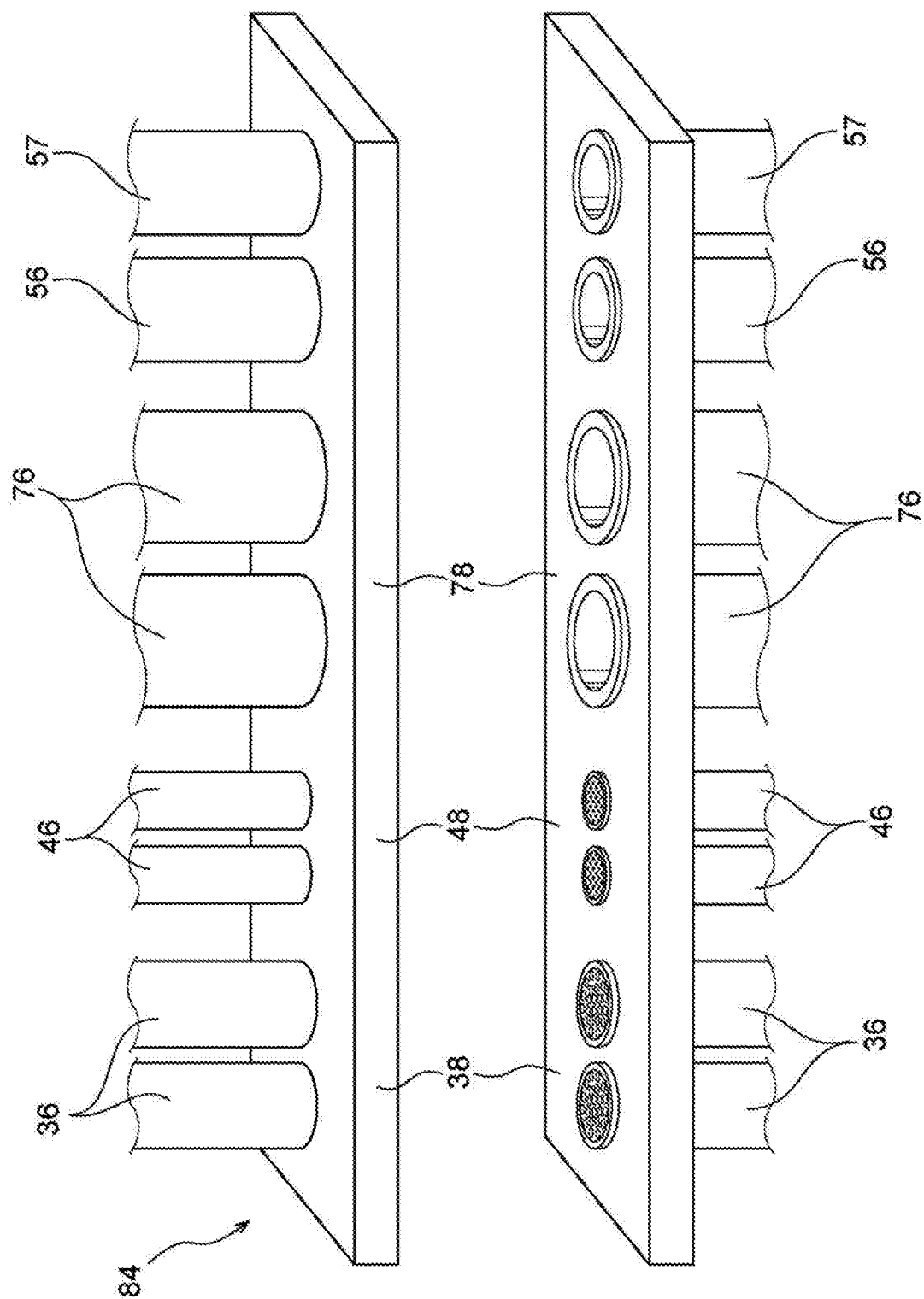
FIG. 16 is a perspective view of a collective connector in a modified example of the fifth embodiment.

For example, all connectors may be integrated. A collective connector 84 illustrated in FIG. 16 is a common connector configured to place, in a connected state, the liquid pipe 56 and the air pipe 57 in addition to the power connector 38, the signal connector 48, and the piping connector 78.

With the collective connector 84, it is possible to complete connection of the power cable 36, the signal cable 46, the refrigerant piping 76, the liquid pipe 56, and the air pipe 57 by one process step. As a result, it is possible to reduce the number of process steps in manufacturing of vehicles.

Supplementary Description

Each of the foregoing embodiments is related to a fully autonomous vehicle provided with no driver seat. However, each of the foregoing embodiment may be applied to any autonomous vehicles including an autonomous vehicle with a driver seat. In this case, in each of the foregoing embodiments, autonomous driving is performed in a normal state and manual driving can be performed in order to avoid a dangerous situation or can be performed at a given timing. When a driver seat is provided at one of the right and left sides in the vehicle front part in the vehicle-width direction, the front doorway 25 can be provided at the other one of the right and left sides in the front wall 20C in the vehicle-width direction.

The foregoing embodiments may be combined with each other. For example, the structure on the front side and the structure on the rear side may be reversed in the vehicle longitudinal direction in the vehicles of the second to fifth embodiments as in Modified Example 1 of the first embodiment. Further, for example, as in Modified Example 2 of the first embodiment, the length of the vehicle center part may be changed in the vehicles of the second to fifth embodiments. Further, for example, the air conditioning system 70 of the third to fifth embodiments may be applied to the vehicle 100 of the second embodiment.

In the air conditioning system 70 of the third to fifth embodiments, the roof 20B is provided with the HVAC units 72. However, the arrangement of the HVAC units 72 is not limited to this. For example, the side wall 20D may be provided with the HVAC units 72.

What is claimed is:

1. An electric vehicle comprising:
   a vehicle cabin provided with a floor having a floor surface that is flat, the vehicle cabin being configured such that an occupant is able to be in the vehicle cabin in any one of a seated position and a standing position;
   a battery accommodated under the floor of the vehicle cabin;
   a drive unit provided on one of a front side and a rear side with respect to the battery in a vehicle longitudinal direction;
   an end doorway provided in a longitudinally-end wall of the vehicle cabin, the longitudinally-end wall being provided on the other one of the front side and the rear side with respect to the battery in the vehicle longitudinal direction, and the end doorway being configured such that the occupant is able to get on and off the electric vehicle through the end doorway; and
   an end slope provided at the end doorway, the end slope being configured to extend from the floor surface toward an outside of the vehicle cabin in a use position, the end slope being configured to be positioned between the floor surface and the battery in an accommodation position.

2. The electric vehicle according to claim 1, further comprising a side doorway provided in a side wall of the vehicle cabin, the side doorway being configured such that the occupant is able to get on and off the electric vehicle through the side doorway, the side wall being an end wall of the vehicle cabin in a vehicle-width direction.

3. The electric vehicle according to claim 2, further comprising a side slope provided at the side doorway, the side slope being configured to extend from the floor surface toward an outside of the vehicle cabin.

4. The electric vehicle according to claim 1, further comprising
   a side doorway provided in a side wall of the vehicle cabin, the side doorway being configured such that the occupant is able to get on and off the electric vehicle through the side doorway, the side wall being an end wall of the vehicle cabin in a vehicle-width direction; and a side slope provided at the side doorway, the side slope being configured to extend from the floor surface toward an outside of the vehicle cabin, the side slope being accommodated at a position that does not overlap with the accommodation position of the end slope in a plan view of a part of the electric vehicle under the floor.

5. The electric vehicle according to claim 1, further comprising a connector configured to electrically connect the battery and the drive unit to each other at a junction between a vehicle center part and one of a vehicle front part and a vehicle rear part, the one of the vehicle front part and the vehicle rear part including the drive unit, the vehicle center part being a part of the electric vehicle, and the vehicle center part including the battery, the vehicle front part being a part of the electric vehicle, the vehicle front part including one of the drive unit and the end doorway, the vehicle front part being coupled to the vehicle center part, and the vehicle rear part being a part of the electric vehicle, the vehicle rear part including the other of the drive unit and the end doorway, the vehicle rear part being coupled to the vehicle center part.

6. An electric vehicle comprising:

a vehicle cabin provided with a floor having a floor surface that is flat, the vehicle cabin being configured such that an occupant is able to be in the vehicle cabin in any one of a seated position and a standing position;

a battery accommodated under the floor of the vehicle cabin;

a drive unit provided on one of a front side and a rear side with respect to the battery in a vehicle longitudinal direction;

an end doorway provided in a longitudinally-end wall of the vehicle cabin, the longitudinally-end wall being provided on the other one of the front side and the rear side with respect to the battery in the vehicle longitudinal direction, and the end doorway being configured such that the occupant is able to get on and off the electric vehicle through the end doorway;

an end slope provided at the end doorway, the end slope being configured to extend from the floor surface toward an outside of the vehicle cabin in a use position;

a side doorway provided in a side wall of the vehicle cabin, the side doorway being configured such that the occupant is able to get on and off the electric vehicle through the side doorway, the side wall being an end wall of the vehicle cabin in a vehicle-width direction; and a side slope provided at the side doorway, the side slope being configured to extend from the floor surface toward an outside of the vehicle cabin, the side slope being accommodated at a position that does not overlap with an accommodation position of the end slope in a plan view of a part of the electric vehicle under the floor.

7. The electric vehicle according to claim 6, further comprising a connector configured to electrically connect the battery and the drive unit to each other at a junction between a vehicle center part and one of a vehicle front part and a vehicle rear part, the one of the vehicle front part and the vehicle rear part including the drive unit, the vehicle center part being a part of the electric vehicle, and the vehicle center part including the battery, the vehicle front part being a part of the electric vehicle, the vehicle front part including one of the drive unit and the end doorway, the vehicle front part being coupled to the vehicle center part, and the vehicle rear part being a part of the electric vehicle, the vehicle rear part including the other of the drive unit and the end doorway, the vehicle rear part being coupled to the vehicle center part.

* * * * *